United States Patent
Rockwell et al.

(10) Patent No.: US 11,280,973 B2
(45) Date of Patent: Mar. 22, 2022

(54) COMPACT PACKAGE FOR HIGH-ASPECT-RATIO RECTANGULAR (HARR) OPTICAL FIBER OR OTHER OPTICAL FIBER

(71) Applicant: Raytheon Company, Waltham, MA (US)

(72) Inventors: David A. Rockwell, Culver City, CA (US); Friedrich P. Strohkendl, Santa Monica, CA (US); Ray McVey, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/889,392

(22) Filed: Jun. 1, 2020

(65) Prior Publication Data
US 2021/0373266 A1    Dec. 2, 2021

(51) Int. Cl.
*G02B 6/38* (2006.01)
*G02B 6/44* (2006.01)

(52) U.S. Cl.
CPC ......... *G02B 6/4441* (2013.01); *G02B 6/3838* (2013.01); *G02B 6/4477* (2013.01)

(58) Field of Classification Search
CPC .................................................. G02B 6/036
See application file for complete search history.

(56) References Cited

U.S. PATENT DOCUMENTS

| | | | |
|---|---|---|---|
| 5,201,015 A * | 4/1993 | von Bieren | G01B 11/16 356/477 |
| 6,496,301 B1 | 12/2002 | Koplow et al. | |
| 7,400,812 B2 | 7/2008 | Seifert | |
| 7,533,841 B1 * | 5/2009 | Harrison | B65H 75/14 242/388.5 |
| 7,860,360 B2 | 12/2010 | Rockwell et al. | |
| 7,978,943 B2 | 7/2011 | Rockwell et al. | |
| 7,983,312 B2 | 7/2011 | Shkunov et al. | |

(Continued)

FOREIGN PATENT DOCUMENTS

| | | |
|---|---|---|
| JP | 5921564 B2 | 5/2016 |
| KR | 102135943 B1 * | 7/2020 |

OTHER PUBLICATIONS

Marciante et al., "Semi-guiding high-aspect-ratio core (SHARC) fiber amplifiers with ultra-large core area for single-mode kW operation in a compact coilable package," Optics Express 20238, vol. 20, No. 18, Aug. 2012, 17 pages.

*Primary Examiner* — Eric Wong

(57) ABSTRACT

An apparatus includes a base having walls that define a track. The track has input and output ends and defines a coiled path that spirals inward from the input end, reaches an inflection point where a direction of curvature is reversed, and spirals outward towards the output end. The track is configured to receive and maintain a majority of an optical fiber in an at least substantially planar coiled arrangement. The apparatus also includes a first transition arm positioned at the input end and a second transition arm positioned at the output end. Each transition arm is configured to be mechanically coupled to the base and includes a groove configured to receive and maintain a portion of the optical fiber in an at least substantially straight orientation. The walls and transition arms are configured to maintain thermal contact with the optical fiber along its entire length.

23 Claims, 10 Drawing Sheets

(56) References Cited

U.S. PATENT DOCUMENTS

| | | |
|---|---|---|
| 8,014,426 B2 | 9/2011 | Shkunov et al. |
| 8,493,651 B1 * | 7/2013 | Hu .................... H01S 3/06754 |
| | | 359/341.1 |
| 8,565,272 B2 | 10/2013 | Shkunov et al. |
| 8,594,476 B2 | 11/2013 | Shkunov et al. |
| 8,606,062 B2 | 12/2013 | Shkunov et al. |
| 8,643,942 B2 | 2/2014 | Strohkendl et al. |
| 8,711,471 B2 | 4/2014 | Liu et al. |
| 9,214,781 B2 | 12/2015 | Honea et al. |
| 9,246,303 B1 | 1/2016 | Rockwell et al. |
| 9,293,888 B2 | 3/2016 | Rockwell et al. |
| 9,322,988 B2 | 4/2016 | Digiovanni et al. |
| 9,535,211 B2 | 1/2017 | Rockwell et al. |
| 9,664,869 B2 | 5/2017 | McVey et al. |
| 10,177,521 B2 | 1/2019 | Shkunov et al. |
| 10,263,383 B2 | 4/2019 | Headley |
| 2009/0296746 A1 | 12/2009 | Heaton et al. |
| 2010/0329620 A1 * | 12/2010 | Griffiths ............... G02B 6/4442 |
| | | 385/135 |
| 2014/0054021 A1 * | 2/2014 | Xing ...................... F28D 15/02 |
| | | 165/185 |
| 2014/0362876 A1 | 12/2014 | Schwarzenbach et al. |
| 2014/0363125 A1 * | 12/2014 | Schwarzenbach ....... G02B 6/14 |
| | | 385/29 |
| 2016/0370551 A1 * | 12/2016 | Hill ...................... G02B 6/4439 |

\* cited by examiner

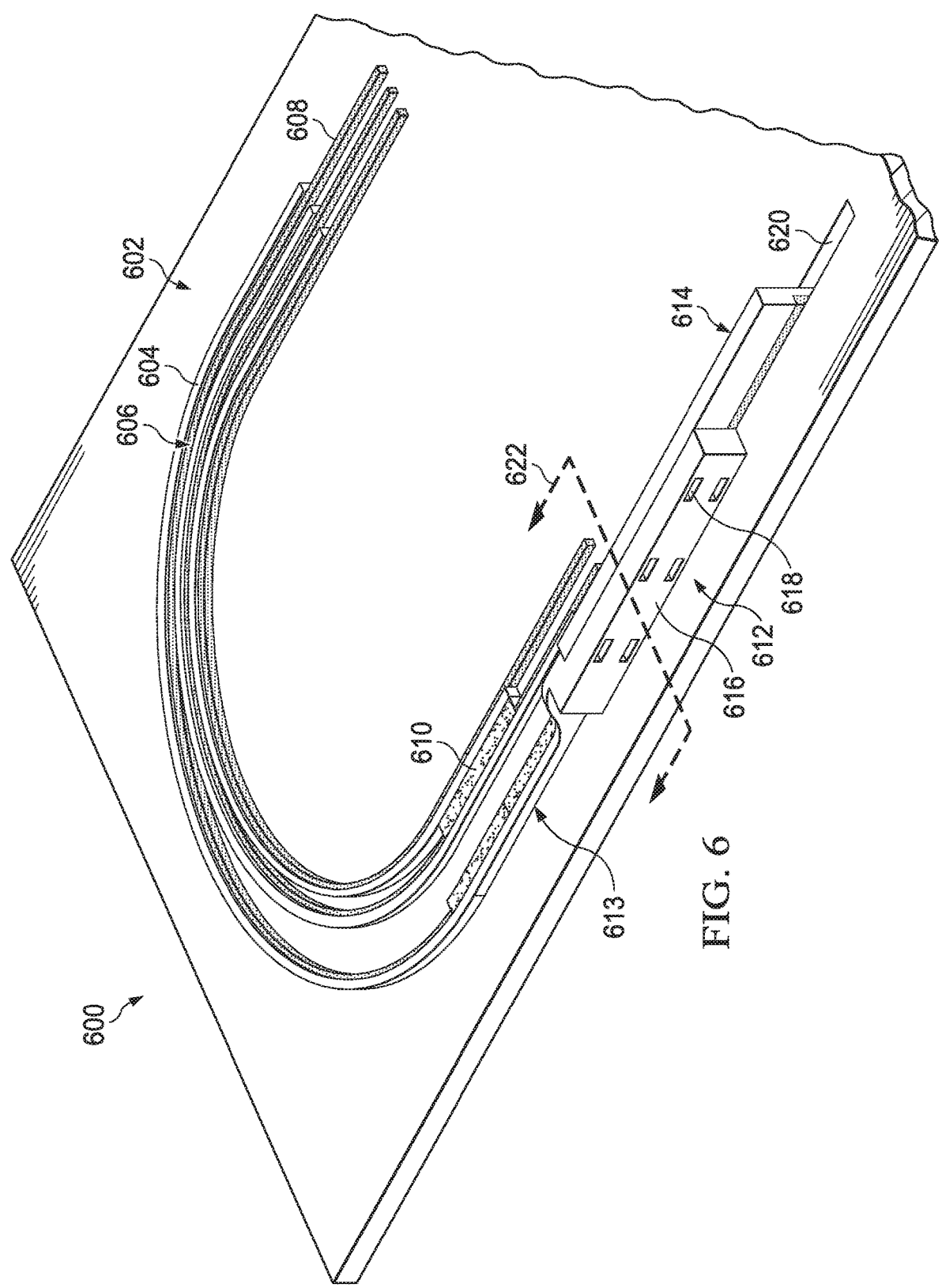

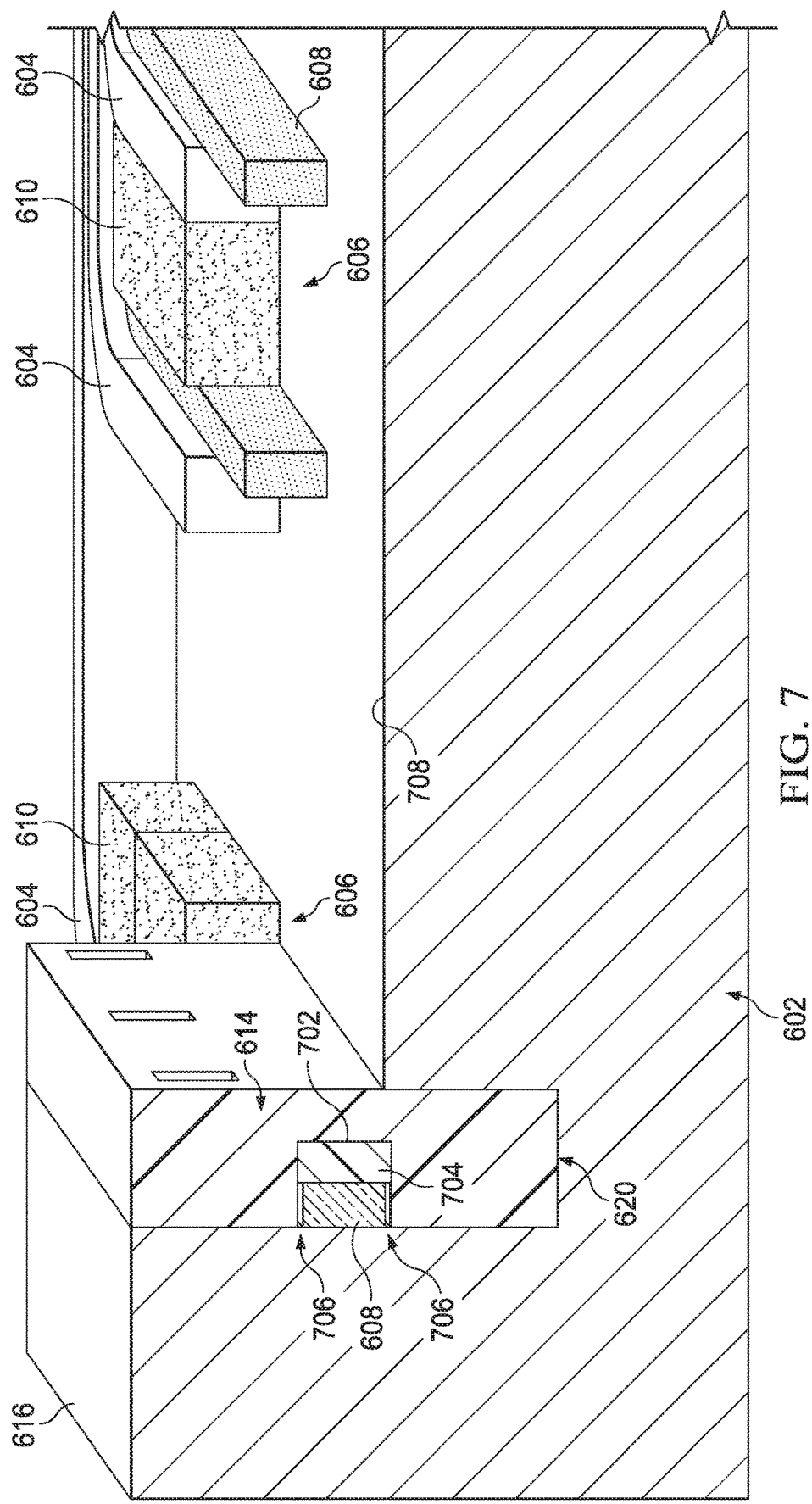

COMPACT PACKAGE FOR HIGH-ASPECT-RATIO RECTANGULAR (HARR) OPTICAL FIBER OR OTHER OPTICAL FIBER

TECHNICAL FIELD

This disclosure is generally directed to optical fibers, such as fiber lasers. More specifically, this disclosure is directed to a compact package for a high-aspect-ratio rectangular (HARR) optical fiber or other optical fiber.

BACKGROUND

Fiber lasers are widely used in many applications, such as telecommunications, industrial fabrication, and defense-related applications. Often times, it is desirable to package a fiber laser in a compact coil, thereby enabling a very high level of performance to be packed into a small, lightweight package. The details of the coil design often depend on the specific shape of the fiber laser. The most common type of fiber laser uses an optical fiber having a circular cross-section, and these fiber lasers can be easily packaged into compact coils. However, fiber lasers that use optical fibers having elliptical, square, and high-aspect-ratio rectangular (HARR) cores are also available, and packaging these types of fiber lasers can be much more difficult.

In one prior approach, a HARR optical fiber was packaged by mounting the optical fiber within a rectangular-shaped helical groove machined into the curved outer surface of a cylindrical metallic spool. Metallic arms were attached tangent to the spool at both (i) a location where the optical fiber initiated its placement within the groove and (ii) a location where the optical fiber ended its placement in the groove. Clamps were used to attach the optical fiber to the metallic arms in the locations where the optical fiber transitioned from the coiled geometry on the spool to the straight geometry on the arms. The clamps also allowed axial tension to be applied to the optical fiber.

SUMMARY

This disclosure provides a compact package for a high-aspect-ratio rectangular (HARR) optical fiber or other optical fiber.

In a first embodiment, an apparatus includes a base having walls that define a track. The track has an input end and an output end and defines a coiled path that spirals inward from the input end of the track, reaches an inflection point where a direction of curvature is reversed, and spirals outward towards the output end of the track. The track is configured to receive a majority of an optical fiber and to maintain the majority of the optical fiber in an at least substantially planar coiled arrangement. The apparatus also includes a first transition arm positioned at the input end of the track and a second transition arm positioned at the output end of the track. Each transition arm is configured to be mechanically coupled to the base and includes a groove configured to receive a portion of the optical fiber and to maintain the portion of the optical fiber in an at least substantially straight orientation. The walls and the transition arms are configured to maintain thermal contact with the optical fiber along an entire length of the optical fiber.

In a second embodiment, a system includes an optical fiber and a package configured to receive the optical fiber. The package includes a base having walls that define a track. The track has an input end and an output end and defines a coiled path that spirals inward from the input end of the track, reaches an inflection point where a direction of curvature is reversed, and spirals outward towards the output end of the track. The track is configured to receive a majority of the optical fiber and to maintain the majority of the optical fiber in an at least substantially planar coiled arrangement. The package also includes a first transition arm positioned at the input end of the track and a second transition arm positioned at the output end of the track. Each transition arm is configured to be mechanically coupled to the base and includes a groove configured to receive a portion of the optical fiber and to maintain the portion of the optical fiber in an at least substantially straight orientation. The walls and the transition arms are configured to maintain thermal contact with the optical fiber along an entire length of the optical fiber.

In a third embodiment, a method includes obtaining a base having walls that define a track. The track has an input end and an output end and defines a coiled path that spirals inward from the input end of the track, reaches an inflection point where a direction of curvature is reversed, and spirals outward towards the output end of the track. The method also includes positioning a first transition arm at the input end of the track and a second transition arm at the output end of the track, where each transition arm is mechanically coupled to the base. The method further includes inserting a majority of an optical fiber into the track, where the track maintains the majority of the optical fiber in an at least substantially planar coiled arrangement. In addition, the method includes inserting portions of the optical fiber into grooves of the transition arms, where the transition arms maintain the portions of the optical fiber in an at least substantially straight orientation. The walls and the transition arms are configured to maintain thermal contact with the optical fiber along an entire length of the optical fiber.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which:

FIGS. 6 through 8B illustrate portions of a specific implementation of a compact package for a HARR optical fiber or other optical fiber according to this disclosure;

DETAILED DESCRIPTION

FIGS. 1 through 15, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
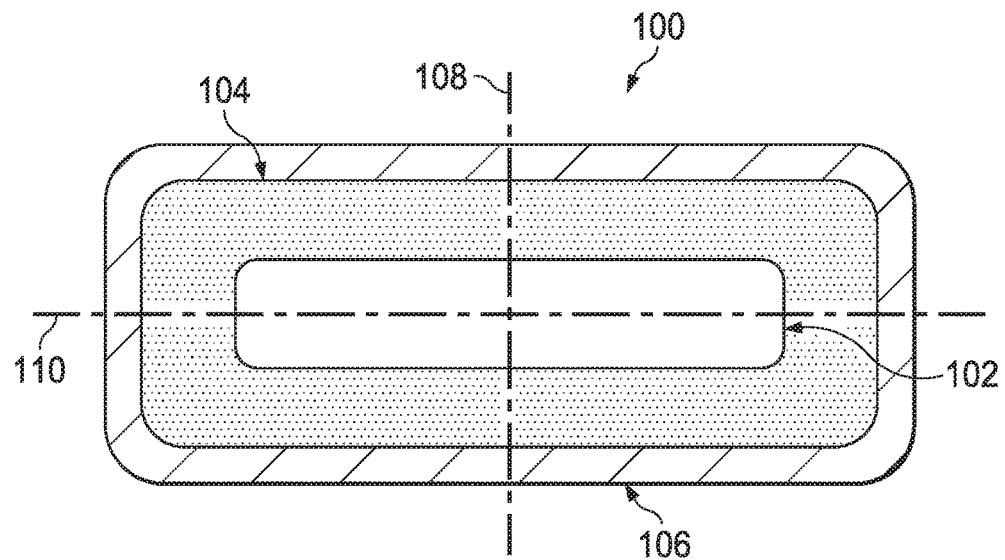
FIG. 1 illustrates an example cross-section of a high-aspect-ratio rectangular (HARR) optical fiber.

FIG. 1 illustrates an example cross-section of a HARR optical fiber 100. More specifically, FIG. 1 illustrates a transverse cross-section of the HARR optical fiber 100 taken across the width of the HARR optical fiber 100, meaning in a plane perpendicular to the length or longitudinal axis of the HARR optical fiber 100. The HARR optical fiber 100 may have any suitable length along its longitudinal axis, such as up to several tens of meters or more.

As shown in FIG. 1, the HARR optical fiber 100 includes a core 102 and at least a first cladding 104 and a second cladding 106. The core 102 has a generally rectangular shape in the cross-section shown in FIG. 1, although the corners of the core 102 may be rounded somewhat in the cross-section. The core 102 generally operates to receive and transport an optical signal, such as a beam from a laser. When implementing an optical fiber amplifier or fiber laser, the core 102 also operates to amplify the optical signal being transported through the HARR optical fiber 100. The core 102 has a first index of refraction.

The core 102 may be formed from any suitable material(s) and in any suitable manner. For example, the core 102 may be formed from silica glass or other material(s) and may be doped, such as with aluminum (Al) at a specified concentration, to achieve the desired first index of refraction. In some cases, the core 102 may also be doped with suitable rare-earth ions or other active lasing ions, such as ytterbium (Yb), neodymium (Nd), erbium (Er), thulium (Tm), or holmium (Ho). In other cases, the core 102 may also be doped with suitable material, such as germanium (Ge), to increase the Raman gain of the silica. Note, however, that this disclosure is not limited to any particular composition or fabrication technique for the core 102.

The first cladding 104 is positioned around the core 102 in the cross-section shown in FIG. 1. The first cladding 104 has a second index of refraction that differs from the first index of refraction, such as when the second index of refraction is lower than the first index of refraction. The difference between the first and second indices of refraction helps to substantially confine a fundamental mode of an input laser beam or other optical signal being transported through the core 102, such as via total internal reflection. However, the difference between the first and second indices of refraction can be small enough so that higher-order modes of the input laser beam or other optical signal can exit the core 102. When used as an optical fiber amplifier or fiber laser, the first cladding 104 can also receive pump light, such as from one or more pump laser diodes or pump laser diode arrays. The pump light can provide the optical energy used to amplify the input laser beam or other optical signal being transported through the core 102.

The first cladding 104 may be formed from any suitable material(s) and in any suitable manner. For example, the first cladding 104 may be formed from silica glass or other material(s) and may be doped to achieve the desired second index of refraction. As a particular example, the first cladding 104 may be formed using silica glass with a doping, such as aluminum at a specified concentration, to achieve the desired second index of refraction. Note, however, that this disclosure is not limited to any particular composition or fabrication technique for the first cladding 104.

The second cladding 106 is positioned around the first cladding 104 in the cross-section shown in FIG. 1. The second cladding 106 has a third index of refraction that differs from the second index of refraction, such as when the third index of refraction is lower than the second index of refraction. The difference between the second and third indices of refraction helps to substantially confine any pump light that may be transported through the first cladding 104, such as via total internal reflection. The second cladding 106 also functions as a protective coating for the HARR optical fiber 100. For example, the second cladding 106 may represent a polymer coating placed on the outer surface of the first cladding 104. Note, however, that this disclosure is not limited to any particular composition or fabrication technique for the second cladding 106.

This represents a simplified description of one possible implementation of a HARR optical fiber 100. Additional features and details are omitted here as being unnecessary for an understanding of this patent disclosure, and any other or additional features may be used with the HARR optical fiber 100 as needed or desired. As a particular example, the HARR optical fiber 100 may include at least one additional cladding between the first and second claddings 104-106 shown here. As another particular example, end features may be present at the left and right edges of the core 102 in the HARR optical fiber 100. Possible implementations of the HARR optical fiber 100 or other optical fiber that may be used here can be found in U.S. Pat. Nos. 7,860,360; 7,978,943; 7,983,312; 8,014,426; 8,594,476; 8,643,942; 9,293,888; 9,322,988; 9,535,211; and 10,177,521 (all of which are hereby incorporated by reference in their entirety).

As shown here, the core 102 has a smaller dimension along a first axis 108 (which extends along what is often called a "fast axis" direction) and a larger dimension along a second axis 110 (which extends along what is often called a "slow axis" direction). The HARR optical fiber 100 generally operates such that an input laser beam or other optical signal propagates along the fiber while being optically guided in the direction of the first axis 108, while the optical signal may or may not be guided in the direction of the second axis 110. Each component of the HARR optical fiber 100 may have any suitable size, shape, and dimensions. In one particular embodiment, for example, the core 102 can have dimensions of about 20 μm by about 340 μm, which provides an aspect ratio of about 17:1. Also, the first cladding 104 can have dimensions of about 230 μm by about 800 μm, and the core 102 may be nominally centered within the first cladding 104.

One advantage of the HARR optical fiber 100 is that it can be easily coiled in the fast-axis dimension, meaning the optical fiber 100 can be bent up and down about the axis 110 in FIG. 1. This coiling can be achieved while providing a very large core area that enables the HARR optical fiber 100 to produce peak and average powers that exceed the capabilities of conventional large mode area (LMA) fibers by more than an order of magnitude. This is because the dimension of the core 102 along the axis 108 and the numerical aperture (NA) of the core 102 can be sufficiently small so that the optical fiber 100 easily bends about the axis 110 without inducing modal distortion transmission loss on an input laser beam or other optical signal propagating within the core 102. The bend sensitivity of the HARR fiber optical 100 about the axis 110 may be similar to that of a conventional LMA fiber having a comparable core dimension and numerical aperture.

One disadvantage of the large core 102 here is that the HARR optical fiber 100 becomes much more sensitive to bends in the slow axis dimension, meaning the optical fiber 100 should not be bent left and right about the axis 108 in FIG. 1. More specifically, even slight bends of the HARR optical fiber 100 about the axis 108 can easily distort the mode profile of the input laser beam or other optical signal propagating within the core 102, thereby precluding the generation of a diffraction-limited output beam. Moreover, the optical impact of a fiber bend or displacement about the axis 108 is much greater for larger core dimensions than for smaller core dimensions. In some cases, the sensitivity of a given core to bends about the axis 108 increases to the third power of the longer core dimension. Thus, for instance, a core 102 that is twice as wide as another core 102 may be about eight times as sensitive to a fiber displacement along the axis 110. This can be problematic in various instances, such as when the HARR optical fiber 100 needs to be long (like tens of meters long) so that it is difficult to package such a long fiber without bending about the axis 108. This can also cause problems for transitions at the input and output ends of the HARR optical fiber 100, which is where the fiber 100 may need to be joined to other components.

Described below are various compact packages for HARR optical fibers or other optical fibers. As described in more detail below, each compact package allows an optical fiber, such as a HARR optical fiber 100, to be coiled in a planar or substantially planar manner, which can help improve the operation of the optical fiber. For instance, this planar or substantially planar coiling of the HARR optical fiber 100 or other optical fiber can help to substantially reduce or minimize displacements of the optical fiber about the axis 108. Also, the direction of curvature of the optical fiber coil can be reversed in each compact package while respecting a minimum bend radius of the optical fiber, which may allow the entire optical fiber to remain planar or substantially planar from its input end to its output end and help to avoid sharp bends in the optical fiber. Further, thermal management can be provided along the entire length of the optical fiber (such as through mechanical contact with a heat sink), which helps to cool the optical fiber and prevent thermal damage to the optical fiber during use. In addition, transition areas at the input and output ends of the optical fiber can be designed to maintain the planar or substantially planar arrangement and the thermal management of the optical fiber. As a result, these compact packages allow HARR optical fibers 100 or other optical fibers to be packaged in compact spiral-coiled arrangements much more easily while maintaining the desired operations of the optical fibers.

Although FIG. 1 illustrates one example of a cross-section of a HARR optical fiber 100, various changes may be made to FIG. 1. For example, the core 102 of the HARR optical fiber 100 may be generally rectangular or otherwise elongated, while the first cladding 104 and/or the second cladding 106 of the HARR optical fiber 100 may be more elliptical. Also, this disclosure is not limited to use with any particular type of optical fiber and may be used with any suitable optical fiber to be coiled.

FIGS. 2 through 5 illustrate an example compact package 200 for a HARR optical fiber 100 or other optical fiber according to this disclosure. For ease of explanation, the compact package 200 shown in FIGS. 2 through 5 may be described as involving the use of the HARR optical fiber 100 of FIG. 1. However, the compact package 200 may be used with any other suitable optical fiber.

Figure 2:
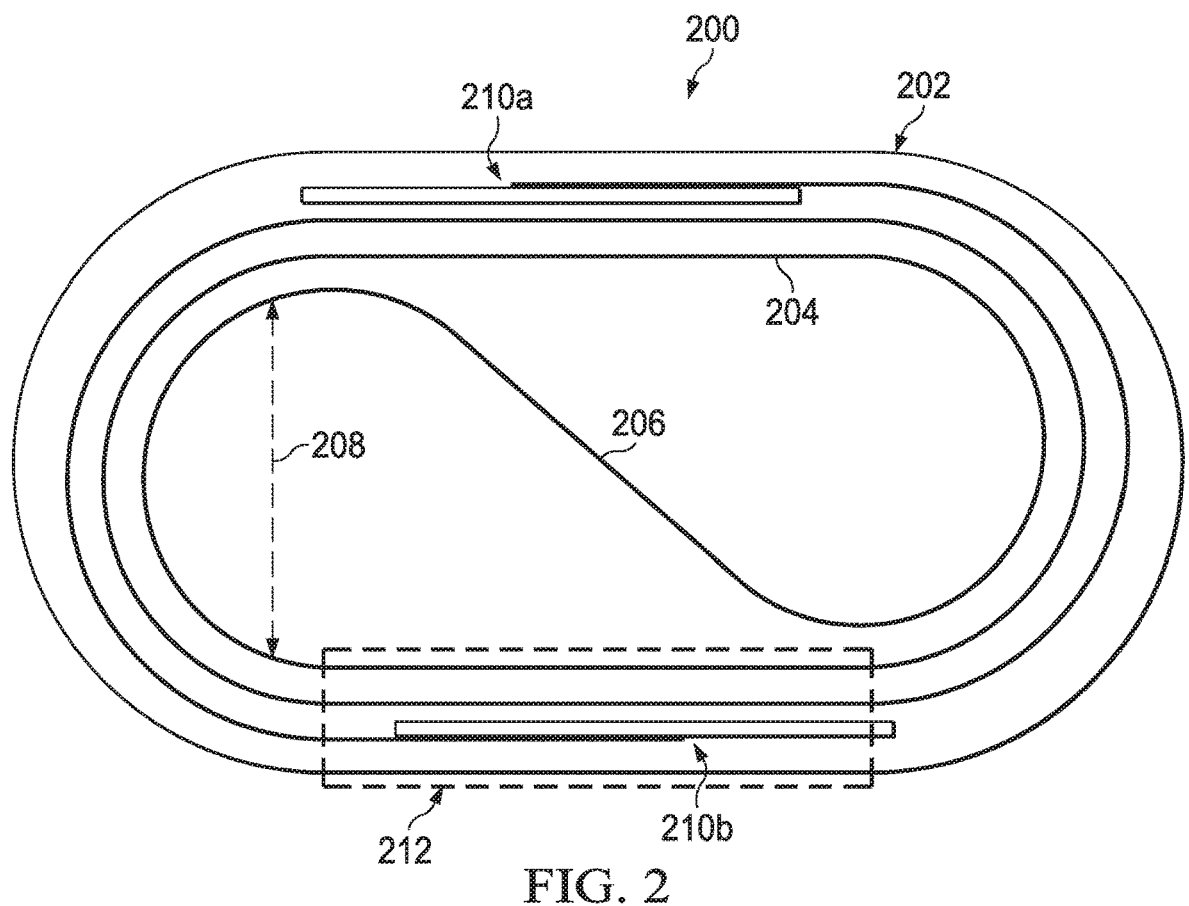
FIGS. 2 through 5 illustrate an example compact package for a HARR optical fiber or other optical fiber according to this disclosure.

As shown in FIG. 2, the compact package 200 is generally designed to perform two complementary functions. First, the compact package 200 includes a base 202 that can be used to support a HARR optical fiber 100 or other optical fiber. Second, the base 202 includes or supports a spiral track 204, which can define a path for the optical fiber in or on the base 202 and which may be formed by raised or recessed walls in the base 202. Both of these functions may be achieved using a single monolithic structure or using multiple complementary structures. If multiple structures are used, the structures may be placed in mechanical contact (such as when one structure sits on top of the other structure) or bonded or otherwise attached to each other. An optical fiber that is placed in the spiral track 204 may make good thermal contact with at least part of the walls, allowing thermal energy that may be contained within the optical fiber to be transferred into the walls of the track 204 and into the base 202. For example, the base 202 and the walls forming the track 204 may be formed from one or more materials that have a high thermal conductivity, such as one or more metals like copper or aluminum or one or more other materials like silicon carbide (SiC). Composite materials may also be used, such as the SUPREMEX 640XA aluminum metal matrix composite from MATERION CORP. Note that while the base 202 of the compact package 200 here has the form of an elongated oval, the base 202 may have any suitable size, shape, and dimensions.

As mentioned above, the base 202 in FIG. 2 includes or supports the track 204, which represents a pathway for a majority of the length of the HARR optical fiber 100 or other optical fiber. For example, the base 202 of the compact package 200 may include raised walls that define a coiled pathway for the majority of the HARR optical fiber 100 or other optical fiber, or the base 202 of the compact package 200 may include a recessed track that defines a coiled pathway for the majority of the HARR optical fiber 100 or other optical fiber. The track 204 defines a spiral path that begins at an input end of the track 204 and gets progressively closer to a center of the base 202 until it reaches an inflection point 206 at or near a central region of the base 202, where the track 204 reverses its direction of curvature and follows a spiral path that gets progressively farther from the center of the base 202 towards an output end of the track 204. Essentially, the track 204 here has the form of an oval spiral moving toward the center of the base 202 and then an oval spiral moving away from the center of the base 202. The track 204 is shown here as being generally linear in the central region of the base 202, although this need not be the case.

The reversal of the coil curvature direction for the optical fiber in the track 204 is accomplished here while not using a bending radius that is less than a specified minimal bending radius of the optical fiber. Any bending of the optical fiber at a bending radius less than the specified minimal bending radius may introduce losses or cause other problems with the use of the optical fiber. In this example, the optical fiber maintains a large distance 208 from itself in the smallest bend diameters of the track 204. The distance 208 can represent any suitable diameter, such as about 6 inches (about 15.25 centimeters). Of course, other distances 208 may be used depending, among other things, on the design of the optical fiber being coiled in the track 204. Here, the track 204 allows the optical fiber to start at one end of the track 204, wind through a spiral towards the center of the base 202, pass through the inflection point 206, and wind back out away from the center of the base 202.

The existence of the inflection point 206 along the track 204 allows the track 204 to translate closer to the center of the base 202 and then translate farther from the center of the base 202 such that both ends of the optical fiber may be conveniently located along the outside of the coils (and, in this particular example, on opposite sides of the coils). As a result, additional fibers or other components may be coupled to either or both ends of the optical fiber in the track 204 more easily. This coiling and the presence of the inflection point 206 also avoid the necessity of using any tight fiber bends along the track 204, which can help to avoid the creation of distortions in or damage to the optical fiber. In addition, this coiling and the use of the inflection point 206 may help the base 202 to achieve a somewhat more uniform temperature distribution or at least narrow the range between maximum and minimum temperatures of the base 202. Assume that the optical fiber has a longitudinal temperature gradient, meaning the temperature of the optical fiber increases moving from the input end to the output end of the optical fiber. In this example, any two adjacent fiber track segments in the coiled arrangement of the track 204 may have opposite thermal conditions, namely one segment will be closer to the lower-temperature end of the optical fiber and the other segment will be closer to the higher-temperature end of the optical fiber. Because of this, the coiled optical fiber may have a systematic temperature gradient along the length of the track 204, and the base 202 may be designed so that warmer and cooler segments of the optical fiber are adjacent to each other.

Transition areas 210a-210b are located at opposite ends of the track 204. The transition areas 210a-210b represent areas where the base 202 is designed to facilitate coupling of the optical fiber in the track 204 to input and output components of a larger system while maintaining good thermal contact between the base 202 and the optical fiber. For example, each of the transition areas 210a-210b may represent a region where a wall of the base 202 and a straight transition arm extending from the wall are used to maintain the optical fiber in an at least substantially straight orientation and to maintain thermal management of the optical fiber. Each transition arm can be mechanically coupled to or rest against the same base 202 as the optical fiber, which can help align the orientation of the transition arms relative to the plane of the base 202.

Figure 3:
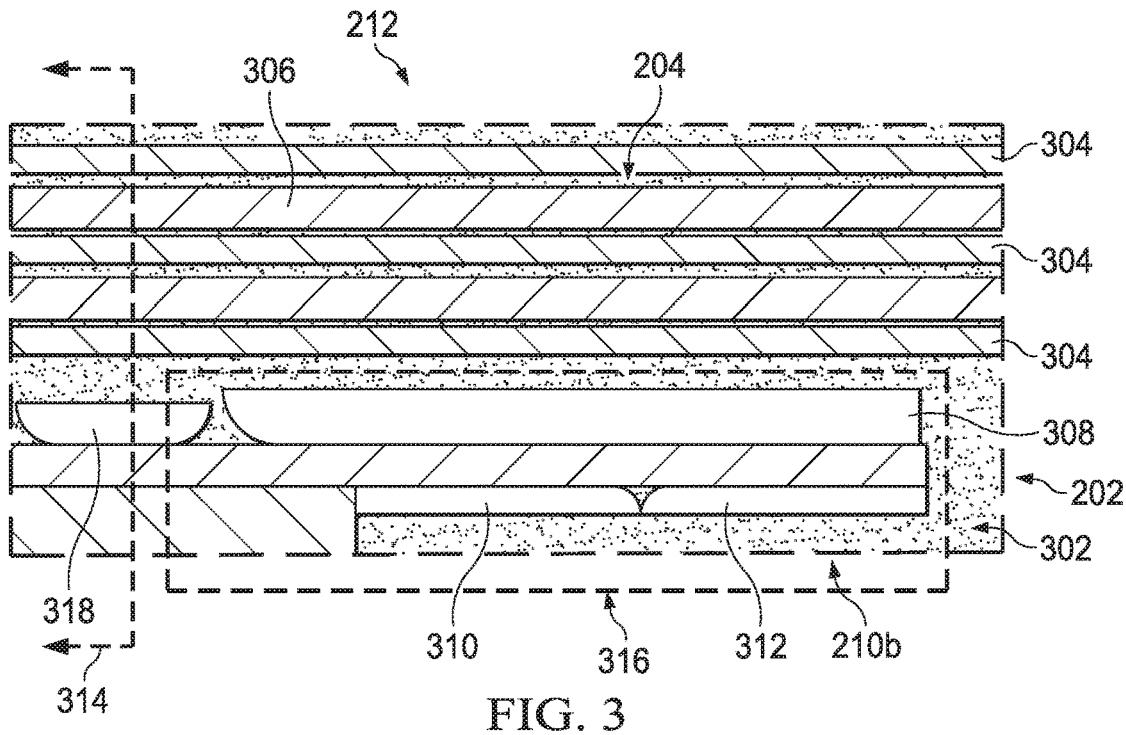

A dashed box 212 shown in FIG. 2 is enlarged in FIG. 3. As can be seen in FIG. 3, the base 202 of the compact package 200 includes areas in which a base level 302 is exposed, as well as walls 304 that extend upward from the base level 302. The walls 304 define the track 204, and an optical fiber 306 (which may or may not represent a HARR optical fiber 100) is coiled within the track 204. Some walls 304 of the base 202 separate different segments of the optical fiber 306, and the different segments of the optical fiber 306 may have different temperatures as discussed above.

One of the transition areas 210b is also shown in FIG. 3. In this example, the transition area 210b includes a transition arm 308, a mode stripper 310, and a clamp 312. The transition area 210a may have the same or similar structure as the transition area 210b shown in FIG. 3. The transition arm 308 represents a straight component that extends from one of the walls 304 of the base 202 and maintains the optical fiber 306 in an at least substantially straight orientation. This allows for easier injection of an optical signal into or exiting of an optical signal from the optical fiber 306. Also, the base 202 and the transition arm 308 are designed so that the optical fiber 306 maintains substantially the same distance from the base level 302 throughout its entire traversal through the track 204 and through both transition areas 210a-210b, which can reduce or substantially eliminate any bends of the optical fiber 306 about the axis 108 in the dimension perpendicular to the base level 302. In addition, the transition arm 308 can be used to remove thermal energy from the optical fiber 306, thereby helping to cool the associated segment of the optical fiber 306.

The transition arm 308 includes any suitable structure configured to maintain an optical fiber in a desired position or orientation as the optical fiber enters or exits a track. The transition arm 308 may be formed from any suitable material(s). For example, the transition arm 308 may be formed from copper, aluminum, silicon carbide, or a composite material. The transition arm 308 may also be formed in any suitable manner. For instance, the transition arm 308 may be formed using machining, casting, injection molding, or additive manufacturing.

The mode stripper 310 operates to pull optical energy and thermal energy from the optical fiber 306. For example, the optical fiber 306 may include a polymer cladding (such as the second cladding 106) or other outer cladding, and it is possible for some optical energy (such as from the first cladding 104) to spill into or otherwise enter the outer cladding. The mode stripper 310 can be used to pull out the optical energy propagating through the outer cladding, converting that optical energy into thermal energy. The mode stripper 310 can also transport the thermal energy into the base 202 or other structure, which helps to reduce or minimize the impacts of the optical energy propagating in the outer cladding.

Figure 12:
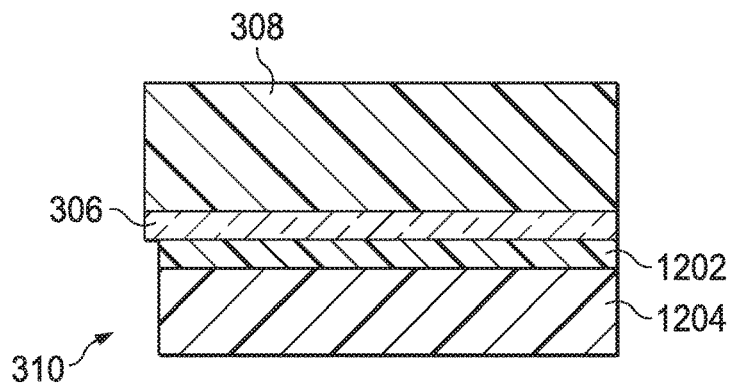
FIG. 12 illustrates an example mode stripper used with a compact package for a HARR optical fiber or other optical fiber according to this disclosure.

The mode stripper 310 includes any suitable structure configured to remove optical energy from a cladding of an optical fiber. In some embodiments, the mode stripper 310 includes graphite or other material for removing optical energy and a thermally-conductive support structure. In particular embodiments, the mode stripper 310 may include an EGRAF HITHERM thermal interface material with a metal backing plate. One example of the mode stripper 310 is shown in FIG. 12, which is described below.

Figure 13:
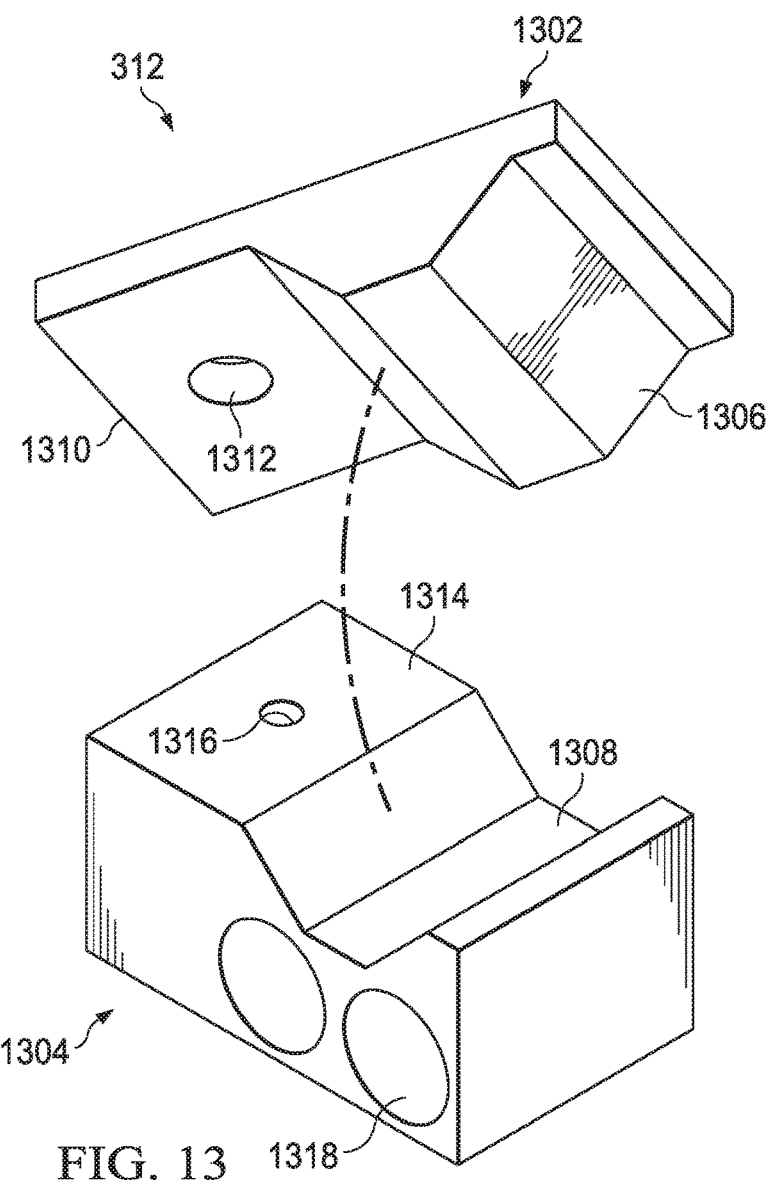
FIG. 13 illustrates an example clamp used with a compact package for a HARR optical fiber or other optical fiber according to this disclosure.

The clamp 312 can be mechanically coupled to the optical fiber 306 and to the transition arm 308 or the base 202. The clamp 312 helps to hold one end of the optical fiber 306 securely so that, for example, other components may be coupled to or otherwise used with the optical fiber 306. The clamp 312 can also transport thermal energy from that portion of the optical fiber 306 into the base 202 or other structure. The clamp 312 includes any suitable structure configured to secure an end of an optical fiber. In some embodiments, the clamp 312 may represent a two-piece component that can be placed around at least the optical fiber 306, where the two pieces of the clamp 312 can be coupled to each other to secure the optical fiber 306 in place. One example of the clamp 312 is shown in FIG. 13, which is described below.

In some embodiments, the polymer cladding of the optical fiber 306 may be removed from an end of the optical fiber 306, such as the part of the optical fiber 306 that is held by the clamp 312. In these embodiments, any part of the clamp 312 or transition arm 308 that contacts the stripped portion of the optical fiber 306 may be coated with a material having a low index of refraction, such as polytetrafluoroethylene (TELFON), to provide optical decoupling. Also, while not shown here, the transition arm 308 may have a stepped thickness such that the transition arm 308 becomes wider/ thicker at the point where the outer cladding of the optical fiber 306 has been removed, which can allow the transition arm 308 to maintain good thermal contact with the optical fiber 306 even where the optical fiber 306 has had its outer cladding removed.

An optional stress relief 318 may be provided prior to the transition arm 308, which can help to isolate the tip of the optical fiber 306 from the remainder of the optical fiber 306. In some embodiments, the stress relief 318 may represent a region in which the optical fiber 306 is bonded to the base 202, such as by using an epoxy. Epoxy can conform to the overall shape of the optical fiber 306 and minimize distortion on the optical fiber 306. The epoxy can be applied to the polymer coating of the optical fiber 306, or the polymer coating might be stripped so that the epoxy can be applied to the inner cladding. In other embodiments, the stress relief 318 may be formed from metal or other material and can be pushed against the optical fiber 306. In those embodiments, caution can be taken to control compression on the optical fiber 306, and stand-offs may be used so that compression on the coated optical fiber 306 is minimal but sufficient to achieve holding power.

Note that various components in FIG. 3 may have rounded edges. For example, at least one edge of the transition arm 308, at least one edge of the mode stripper 310, at least one edge of the clamp 312, and/or at least one edge of the optional stress relief 318 may be rounded. This rounding may help to provide a taper that softens bulging of the optical fiber's polymer coating at certain edges of various components, which may be desirable since bulging can disturb the fast axis.

Figure 4:
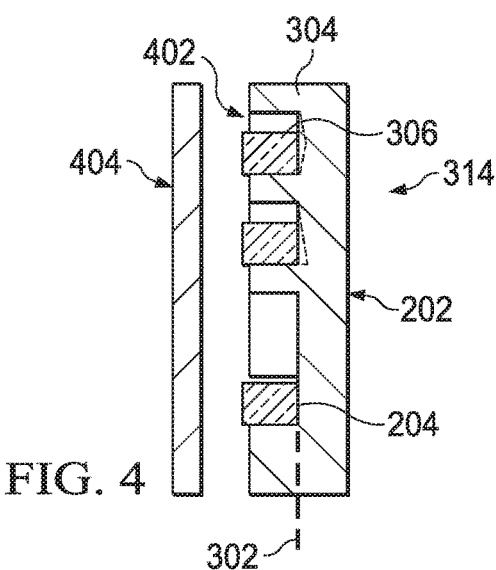

A cross-section of the structure along a line 314 in FIG. 3 is shown in FIG. 4, except the optional stress relief 318 has been omitted. As can be seen in FIG. 4, the optical fiber 306 fits completely or substantially within each portion of the track 204. Ideally, the optical fiber 306 rests against or is otherwise in thermal contact with various walls 304 or other portions of the base 202 of the compact package 200 along the entire length of the optical fiber 306, which can help with thermal management of the optical fiber 306. In some cases, hoop stresses caused by coiling the optical fiber 306 may push the optical fiber 306 into the walls 304 along the outer edges of the track 204, which can help the optical fiber 306 to make good thermal contact with the walls 304. If necessary or desired, one or more spacers 402 may be inserted along the track 204 to help push the optical fiber 306 into the walls 304 or to otherwise remove thermal energy from the optical fiber 306. The one or more spacers 402 may extend along the entire length of the track 204. Depending on the design of the track 204, multiple spacers 402 may have the same general thickness, or different spacers 402 may have different thicknesses. The spacers 402 themselves may be thermally conductive in order to help pull thermal energy from the optical fiber 306 and to provide the thermal energy to the base 202. In some embodiments, the spacers 402 may be formed using a metal foil, a soft thermal pad (like a silicone pad), or other suitable thermally-conductive material(s).

Another thermal management technique is to have the track 204 be slightly wider than the optical fiber's narrow dimension and to fill or partially fill the track 204 with a high-conductivity thermal compound that can accommodate variations in the fiber's thickness and still ensure good thermal contact on both sides of the optical fiber 306. Any suitable high-conductivity thermal compound may be used for this purpose. For instance, silicone-based thermal compounds may have the desired thermal and mechanical properties. While the use of silicone-based thermal compounds is generally avoided with lasers and other optical devices due to the fact that the silicone material tends to contaminate optical surfaces, various components of an optical system (including the optical fiber 306) can be connected with fusion splices, leaving no surfaces that might be susceptible to such contamination except the optical fiber's input and output tips. These tips may be contained within a sealed chamber or otherwise protected against silicone contamination.

As noted above, some optical fibers (such as HARR optical fibers 100) may be highly tolerant to bending about one axis (such as the axis 110) and extremely sensitive to bending about another axis (such as the axis 108). To help avoid bends about the sensitive axis, the track 204 (or at least the base level 302 of the track 204) may be at least substantially planar. When an optical fiber 306 is placed into the track 204, the optical fiber 306 may be pushed down so that its outer cladding (such as the cladding 106) makes good contact with the base level 302 of the track 204. In this way, for example, the HARR optical fiber 100 can bend about the axis 110 to follow the coiled path of the track 204, but the base 202 helps to reduce or minimize bending of the HARR optical fiber 100 about the axis 108.

In some cases, it may suffice to simply place the optical fiber 306 in the track 204 and rely on the flat bottom of the track 204 to avoid undesired bends of the optical fiber 306. In other cases, the track 204 may be designed so that the optical fiber 306 extends slightly above the top of the track 204, which is indicated in FIG. 4. In those cases, a lid 404 or other structure can be attached to the base 202 in order to uniformly press the optical fiber 306 into the track 204. The lid 404 can be coupled to the base 202 in any suitable manner, such as by using bolts or other mechanical connectors.

As shown in FIG. 4, the track 204 may have a non-uniform width. In this particular example, while the two top portions of the track 204 in FIG. 4 appear to have the same general width, the bottom portion of the track 204 in FIG. 4 has a much larger width. This helps this portion of the track 204 accommodate the transition arm 308, mode stripper 310, and clamp 312 in the associated transition area 210a or 210b. Any suitable technique may be used to enlarge at least a portion of the track 204 here. Various approaches for widening a portion of the track 204 are provided below, although other approaches may also be used.

Note that while the bottom surface of each part of the track 204 in FIG. 4 is shown as being planar at the base level 302, this need not be the case. For example, the bottom surface of at least part of the track 204 may be V-shaped to help center the optical fiber 306 within the track 204. As another example, the bottom surface of at least part of the track 204 may be slanted and become deeper moving outward from a center of the base 202 (meaning the track 204 becomes deeper moving from the inner wall to the outer wall of the track 204). Both of these example options are shown in FIG. 4.

Figure 5:
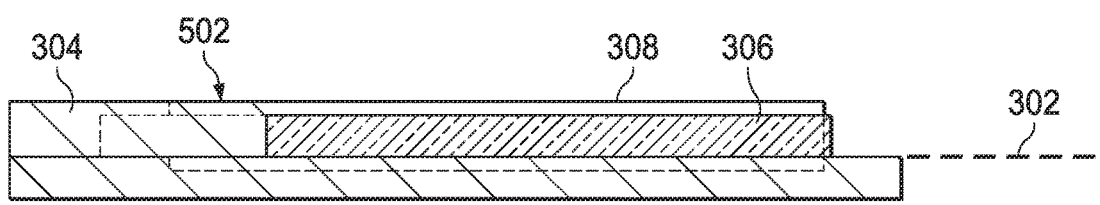

A side view of a portion of the structure shown in a dashed box 316 in FIG. 3 is presented in FIG. 5, except the optional stress relief 318 has again been omitted. As can be seen in FIG. 5, the mode stripper 310 and clamp 312 have also been omitted, and the side view excludes the walls 304 and other components beyond (above) the dashed box 316 in FIG. 3 for simplicity. As can be seen in FIGS. 3 and 5, there is a region 502 that is positioned between an area in which the optical fiber 306 contacts the wall 304 of the base 202 and an area in which the optical fiber 306 contacts the transition arm 308. Care may be taken in the design of this region 502 to help ensure that the optical fiber 306 has adequate cooling in transitioning from being in the track 204 to being attached to the transition arm 308. Specifically, while in the track 204, thermal energy may be transferred to the adjacent wall 304 of the track 204 (downward in FIG. 3). As soon as the optical fiber 306 no longer has contact with the wall 304 of the track 204, thermal energy may need to be transferred to the transition arm 308 (upward in FIG. 3). Thus, the design of the region 502 can help ensure that adequate "squeeze" is applied on the optical fiber 306 so that good thermal contact is maintained between the optical fiber 306 and either the nearby wall 304 or the transition arm 308. This squeeze can be accomplished using any suitable mechanism, such as spring-loaded bolts or other connectors that are used to mechanically attach the transition arm 308 to a portion of a wall 304.

Note that the walls 304 of the compact package 200 may represent walls that extend upward from a planar base level 302, or the walls 304 of the compact package 200 may represent walls that are formed by recessing the track 204 down to the base level 302. Thus, the compact package 200 may be formed in various ways. For example, the base 202 of the compact package 200 may be formed using an integral piece of material, where the material is etched or otherwise processed to include raised walls or a recessed track. The base 202 of the compact package 200 may alternatively be formed using casting, injection molding, additive manufacturing, or other suitable fabrication technique.

Although FIGS. 2 through 5 illustrate one example of a compact package 200 for a HARR optical fiber 100 or other optical fiber, various changes may be made to FIGS. 2 through 5. For example, the base 202 may have any other suitable track 204 that coils an optical fiber 306 with a curvature in one direction and then with a reversed curvature in the opposite direction. As a particular example, the number of coils of the optical fiber 306 in each direction can vary based on the length of the optical fiber 306 being coiled. Moreover, each component of the compact package 200 may have any suitable size, shape, and dimensions. In addition, the relative sizes and dimensions of the components of the compact package 200 may vary as needed or desired.

FIGS. 6 through 8B illustrate portions of a specific implementation of a compact package 600 for a HARR optical fiber or other optical fiber according to this disclosure. The compact package 600 may represent a specific implementation of the compact package 200 described above. Thus, unless otherwise indicated, the same features and functions of the compact package 200 described above may be used in the compact package 600. For ease of explanation, the compact package 600 shown in FIGS. 6 through 8B may be described as involving the use of the HARR optical fiber 100 of FIG. 1. However, the compact package 600 may be used with any other suitable optical fiber.

As shown in FIG. 6, the compact package 600 includes a base 602, such as a flat plate. The base 602 includes walls 604 that define a track 606 for an optical fiber 608, where the bottom surface of the track 606 may be at least substantially planar. Note that portions of the walls 604 have been removed in FIG. 6 so that various features of the compact package 600 are more clearly visible. In some embodiments, the track 606 of FIG. 6 may follow the same general pattern as the track 204 in FIG. 2, although this need not be the case.

One or more spacers 610 can be inserted along the length of the track 606 in order to help facilitate thermal management of the optical fiber 608. For example, each of the spacers 610 may represent a metal foil, or each of the spacers 610 may represent a soft thermal pad (like a silicone pad) formed using a low-modulus polymer material that is highly conformable to uneven or rough surfaces. The spacers 610 may represent any other suitable thermally-conductive material(s). A single continuous spacer 610 may be positioned along the length of the track 606, although it may be easier to insert multiple smaller spacers 610 along the length of the track 606. Note that while only a few spacers 610 are shown in select areas of the track 606 in FIG. 6, one or more spacers 610 may be positioned along the entire length of the track 606 to help with thermal management of the optical fiber 608 along its entire length.

In this example, other than near an inflection point, successive portions of the track 606 are generally spaced equally by adding a constant increment to the radius of curvature where the track 606 makes a 180° turn. However, as the outermost portion of the track 606 begins to approach a transition area 612, the radius of curvature of the outer wall 604 in that portion of the track 606 is increased by an increment that is larger than the increment used in the previous 180° turns. This increase in the radius of curvature results in an increase in the width of the track 606 as the track 606 approaches the transition area 612. After completing the final 180° turn, the wall 604 of the track 606 continues with another straight section 613 that is parallel to the straight sections of the inner walls 604. The extra track width produced by the increase in the final radius of curvature provides space to accommodate components in the transition area 612 while still allowing different segments of the coiled optical fiber 608 to be substantially parallel to one another.

In this example, the transition area 612 includes a transition arm 614. The mode stripper 310 and the clamp 312 of FIG. 3 may be used with the transition arm 614 in the transition area 612, although they are omitted here for ease of illustration and explanation. The transition arm 614 attaches to an enlarged portion 616 of the outer wall 604. In this example, the enlarged portion 616 of the outer wall 604 includes multiple openings 618, which may be used to allow bolts, screws, or other mechanical connectors to pass through the enlarged portion 616 of the outer wall 604 and into the transition arm 614. This allows the connectors to be used to help clamp the optical fiber 608 between the enlarged portion 616 of the outer wall 604 and the transition arm 614. In some embodiments, the openings 618 are elongated in a direction parallel to the length of the optical fiber 608 and to the length of the transition arm 614, which allows the transition arm 614 to be translated somewhat along the length of the optical fiber 608. Among other things, this can help to accommodate multiple individual fibers that may have different total lengths.

In this example, the transition arm 614 is partially recessed down within a groove 620 formed in the base 602 of the compact package 600. The groove 620 may be sized to receive only a lower portion of the transition arm 614. The groove 620 can also be longer than the transition arm 614 so that the transition arm 614 can slide along the groove 620. Along with the elongated openings 618, this allows the compact package 600 to accommodate some small differences in fiber lengths of the optical fiber 608.

A cross-section of the structure along a line 622 in FIG. 6 is shown in FIG. 7. As can be seen in FIG. 7, the optical fiber 608 is positioned within the track 606. In some cases, the optical fiber 608 may extend slightly above the walls 604 and, if desired, a lid (such as a lid 404) or other structure can be attached to the base 602 in order to uniformly press the optical fiber 608 into the track 606. The outer wall 604 is thicker here (as measured side-to-side) compared to other walls 604 due to the presence of the enlarged portion 616 as discussed above.

The transition arm 614 here includes a groove 702 formed lengthwise down the transition arm 614, where the groove 702 is used to receive a portion of the optical fiber 608 and a spacer 704. The spacer 704 here may be formed from the same thermal pad material(s) as the spacers 610. The groove 702 therefore helps to hold the spacer 704 against part of the optical fiber 608 and to hold part of the optical fiber 608 against the enlarged portion 616 of the outer wall 604. If the spacer 704 is somewhat wider than the groove 702 (in the horizontal direction in FIG. 7), this can provide a soft controlled squeeze of the spacer 704 on the optical fiber 608. Note that small gaps 706 are located above and below the optical fiber 608 within the transition arm 614 in this example. These gaps 706 help to ensure that the optical fiber 608 cannot be pinched between the walls of the groove 702. Such pinching may otherwise apply stress across the wide fiber dimension, which might impose some problematic bending about the axis 108.

In some cases, one or more optical beams may be directed into the core and/or cladding(s) of the optical fiber 608 at the very end of the transition arm 614 and the optical fiber 608. It may also be possible for some energy from the optical beam(s) to illuminate the material forming the spacer 704. Depending on the material, it may be that the spacer 704 should not be exposed to such optical energy, since the optical energy may damage or melt the spacer material. In these cases, a shielding can be installed on the end of the transition arm 614 and optical fiber 608 to block any stray optical beams from reaching the spacer 704. One example material for the shielding may include a thin metal sheet that has been trimmed to allow one or more beams to illuminate the fiber tip but not the spacer 704.

Again, in this example, the transition arm 614 is partially recessed down within the groove 620 in the base 602. This groove 620 allows the transition arm 614 to be sized and shaped to receive and hold the optical fiber 608 at a base level 708 of the base 602, which helps to maintain the optical fiber 608 in an at least substantially planar coiled arrangement. The groove 620 therefore extends below the base level 708 of the base 602 to accommodate a portion of the transition arm 614. The groove 702 in the transition arm 614 that holds part of the optical fiber 608 is positioned to substantially or exactly match the height of the optical fiber 608 running along the track 606.

Figure 8A:
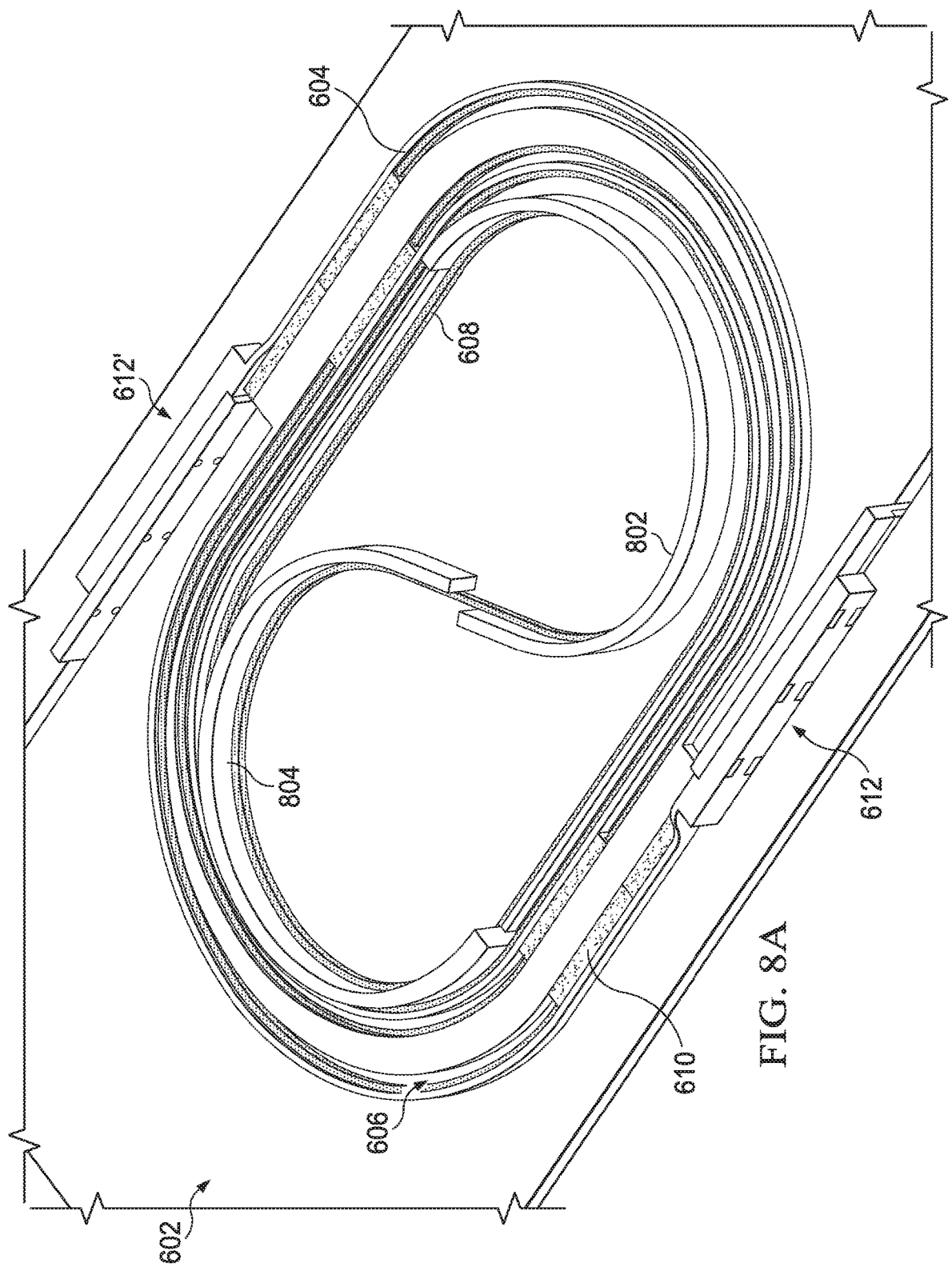

FIG. 8A illustrates the compact package 600 with both input and output transition areas 612, 612'. It can be seen in FIG. 8A how the final turns in the outer walls 604 have larger increments in their radii of curvature in order to provide spaces to accommodate the components in the transition areas 612, 612'. This allows the optical fiber 608 to follow essentially straight paths leading into and out of the track 606.

FIG. 8A also illustrates two overlapping or adjacent structures 802 and 804 at an inflection point where the curvature direction of the optical fiber 608 is reversed. As can be seen here, the optical fiber 608 travels around the inner side of one structure 802 and around the inner side of the other structure 804. This effectively reverses the coiling direction of the optical fiber 608 while maintaining a suitable bending radius of the optical fiber 608. The adjacent ends of the two structures 802 and 804 may terminate at the same point along the optical fiber 608, or the adjacent ends of the two structures 802 and 804 may overlap somewhat. In either case, the portion of the optical fiber 608 traveling along the two structures 802 and 804 may be cooled by the structures 802 and 804 along its entire length. The structures 802 and 804 here may represent additional walls, which may be formed in the same or similar manner as the walls 604.

Figure 8B:
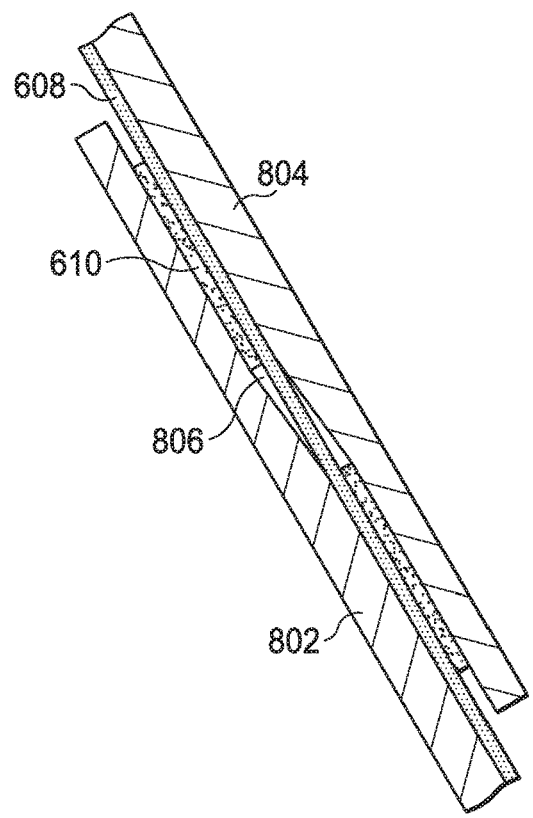

FIG. 8B shows a more detailed view of the intersection and transition zone of the two structures 802 and 804, which is in the vicinity of the inflection point. In this example, it is assumed that the two structures 802 and 804 partially overlap one another. Spacers 610 are positioned between the structures 802 and 804 and the optical fiber 608 in order to push the optical fiber 608 into one of the structures 802 and 804 (namely into outer walls). Also, the structure 802 transitions from a larger thickness to a smaller thickness moving upward towards the end of the structure 802, and the structure 804 transitions from a larger thickness to a smaller thickness moving downward towards the end of the structure 804. This allows the inner walls of the two structures 802 and 804 to be generally parallel and separated from each other by about the thickness of the optical fiber 608. The spacers 610 are also shown here along with regions 806 at the ends of the spacers 610 where the structures 802 and 804 transition to larger thicknesses. These regions 806 may be filled with thermal adhesive or other material that helps maintain good thermal contact between the optical fiber 608 and the structures 802 and 804.

Although FIGS. 6 through 8B illustrate portions of a specific implementation of a compact package 600 for a HARR optical fiber 100 or other optical fiber, various changes may be made to FIGS. 6 through 8B. For example, the base 602 may have any other suitable track 606 that coils an optical fiber 608 with a curvature in one direction and then reverses the curvature direction. As a particular example, the number of coils of the optical fiber 608 in each direction can vary based on the length of the optical fiber 608 being coiled. Moreover, each component of the compact package 600 may have any suitable size, shape, and dimensions. In addition, the relative sizes and dimensions of the components of the compact package 600 may vary as needed or desired.

Figure 9:
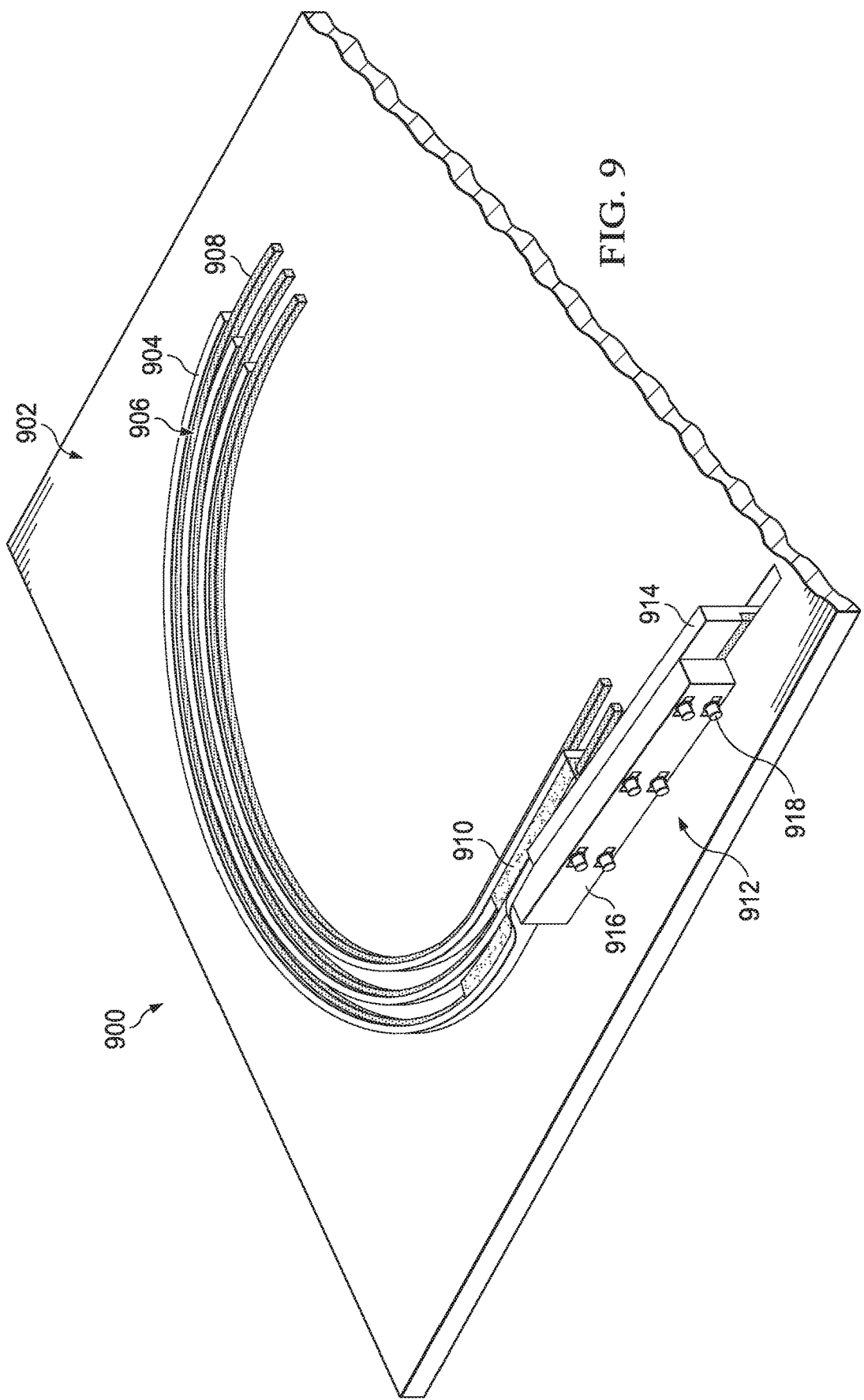
FIGS. 9 and 10 illustrate example alternative features of a compact package for a HARR optical fiber or other optical fiber according to this disclosure.
Figure 10:
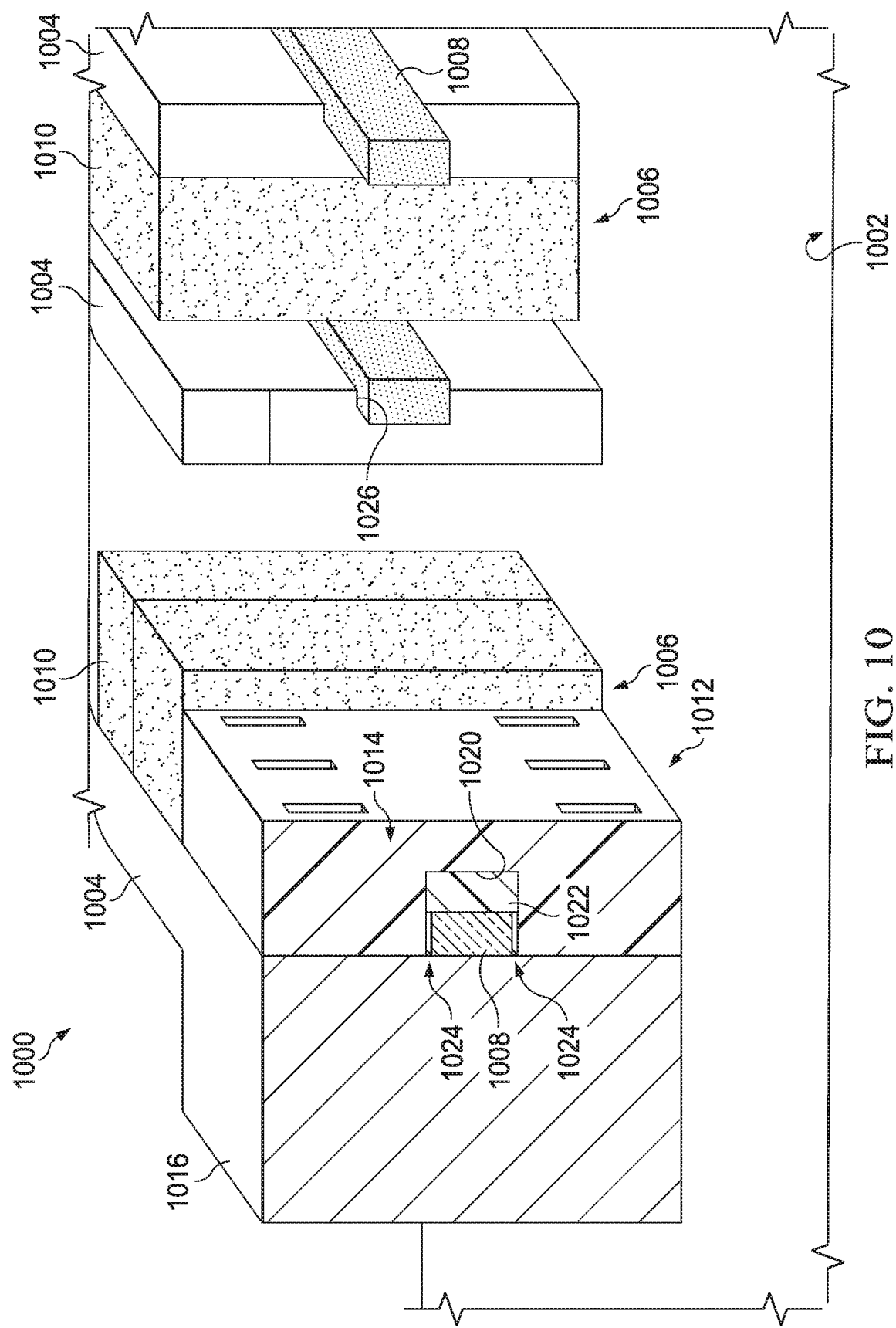

FIGS. 9 and 10 illustrate example alternative features of a compact package for a HARR optical fiber or other optical fiber according to this disclosure. In particular, FIGS. 9 and 10 illustrate examples of features that may be used in some embodiments of the compact package 600 described above. In FIG. 9, a compact package 900 includes a base 902, such as a flat plate. The base 902 includes walls 904 that define a track 906 for an optical fiber 908, where the bottom surface of the track 906 may be at least substantially planar. Note that portions of the walls 904 have been removed in FIG. 9 so that various features of the compact package 900 are more clearly visible. In some embodiments, the track 906 of FIG. 9 may follow the same general pattern as the track 204 in FIG. 2, although this need not be the case. One or more spacers 910 can be inserted along the length of the track 906 in order to help facilitate thermal management of the optical fiber 908. These components may be the same as or similar to corresponding components in FIG. 6.

In this example, rather than using a larger radius of curvature in the outer wall 904, the enlarged portion 916 of the outer wall 904 angles outward to create space for a transition area 912, which includes a transition arm 914. The enlarged portion 916 is attached to the transition arm 914 by bolts or other connectors 918. Because at least the enlarged portion 916 of the outer wall 904 is flared or otherwise angled away from the middle wall 904, there is space between the outer wall 904 and the middle wall 904 for the components of the transition area 912. Depending on the size of the base 902, the angle of the flaring may not need to be very large, such as when an angle of about 5° is sufficient. Similar to the structures described above, the transition arm 914 is used to maintain the optical fiber 908 in an at least substantially straight orientation at the input or output end of the optical fiber 908. The transition arm 914 is also used to maintain thermal contact with the optical fiber 908 when the optical fiber 908 travels past the end of the outer wall 904. A similar arrangement may be used at the opposite end of the optical fiber 908.

In FIG. 10, a compact package 1000 is shown in cross-section similar to FIG. 7. Here, the compact package 1000 includes a base 1002, such as a flat plate. The base 1002 includes walls 1004 that define a track 1006 for an optical fiber 1008, where the bottom surface of the track 1006 may be at least substantially planar. In some embodiments, the track 1006 of FIG. 10 may follow the same general pattern as the track 204 in FIG. 2, although this need not be the case. One or more spacers 1010 can be inserted along the length of the track 1006 in order to help facilitate thermal management of the optical fiber 1008. A transition area 1012 includes a transition arm 1014, which can be coupled to an enlarged portion 1016 of the outer wall 1004. The transition arm 1014 includes a groove 1020 in which part of the optical fiber 1008 and a spacer 1022 are placed. The spacer 1022 here may be formed from the same thermal pad material(s) as the spacers 1010. Gaps 1024 may help to ensure that the optical fiber 1008 cannot be pinched between the walls of the groove 1020. These components may be the same as or similar to corresponding components in FIGS. 6 and 7.

In this example, the optical fiber 1008 fits at least partially within grooves 1026 in the walls 1004 of the base 1002. These grooves 1026 allow a larger portion of the outer surface area of the optical fiber 1008 to contact the walls 1004, which can help to increase the transfer of thermal energy away from the optical fiber 1008 and into the base 1002. In this particular example, the grooves 1026 are sized to receive a portion of the optical fiber 1008, although the grooves 1026 may be sized to have a depth that enables the grooves 1026 to receive the entire optical fiber 1008.

Note that in the example in FIG. 10, the grooves 1026 are shown as residing at or near the midpoint of the height of the walls 1004, which moves the optical fiber 1008 away from the base level of the base 1002. This also makes the walls 1004 taller (and possibly significantly taller) that the optical fiber 1008. In addition, this allows the transition arm 1014 to sit on the base 1002 without being recessed into the base 1002. However, this need not be the case, and the optical fiber 1008 may be placed within grooves 1026 formed along the bottoms of the walls 1004. In those embodiments, the heights of the walls 1004 may more closely match the height of the optical fiber 1008, although the walls 1004 would be taller than the optical fiber 1008 so that the walls 1004 can include the grooves 1026. Also, in those embodiments, the transition arm 1014 can be recessed in the base 1002 as was done in FIG. 7.

Although FIGS. 9 and 10 illustrate examples of alternative features of compact packages 900 and 1000 for a HARR optical fiber 100 or other optical fiber, various changes may be made to FIGS. 9 and 10. For example, each base 902 and 1002 may have any other suitable track 906, 1006 that coils an optical fiber 908, 1008 with a curvature in one direction and then reverses the curvature direction. As a particular example, the number of coils of the optical fiber 908, 1008 in each direction can vary based on the length of the optical fiber 908, 1008 being coiled. Moreover, each component of the compact package 900 or 1000 may have any suitable size, shape, and dimensions. In addition, the relative sizes and dimensions of the components of the compact package 900 or 1000 may vary as needed or desired.

Note that one function of the connectors 918 shown in FIG. 9 (or similar connectors not shown in FIG. 6) is to manage the interface between an enlarged portion 616, 916 of an outer wall 604, 904 and a transition arm 614, 914. This can be done to help ensure that an optical fiber 608, 908 maintains mechanical contact (and therefore thermal contact) with the wall 604, 904 and the transition arm 614, 914, meaning there are no free-floating sections of the optical fiber 608, 908. Ideally, this continuous mechanical contact is achieved without inducing undesirable micro-bends in the optical fiber 608, 908, particularly in the direction of the axis 110. For this reason, it may be undesirable to have the connectors 918 apply excessive pressure on the optical fiber 608, 908 as the optical fiber 608, 908 sits between the outer wall 604, 904 and the transition arm 614, 914, since deformation of the polymer coating may lead to unintended micro-bends in the narrow fiber dimension. Overall, good mechanical contact should be achieved with minimal deformation of the fiber's polymer coating while still having sufficient contact for removal of thermal energy. Also, the transition arm 614, 914 should not apply an excessive squeeze to, or any abrupt displacement of, the optical fiber 608, 908 in the narrow dimension. On the other hand, it is also undesirable to apply insufficient pressure or to apply pressure that is excessive at some times and inadequate at other times depending on environmental conditions or the age of the system.

Figure 11:
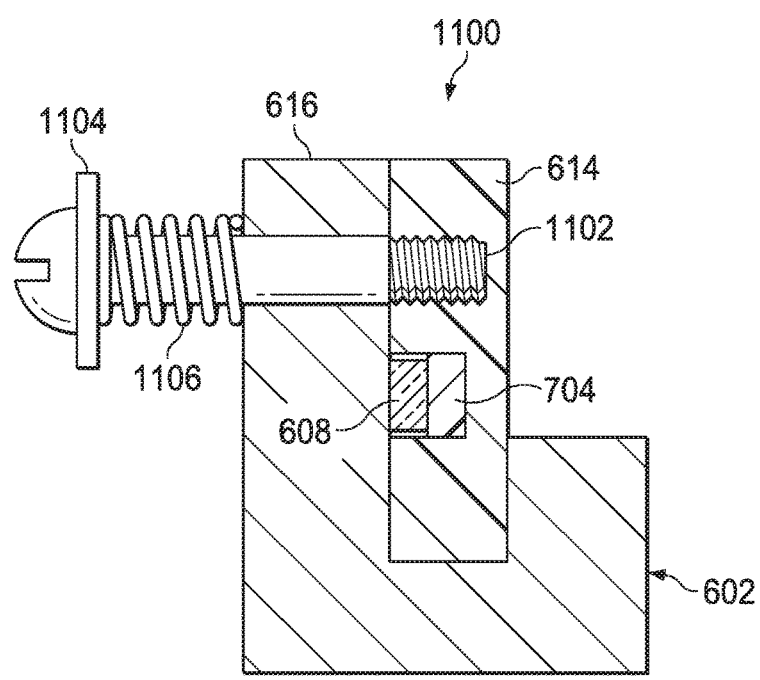
FIG. 11 illustrates an example connector used with a compact package for a HARR optical fiber or other optical fiber according to this disclosure.

FIG. 11 illustrates an example connector 1100 used with a compact package for a HARR optical fiber or other optical fiber according to this disclosure. For ease of explanation, the connector 1100 may be described as being used in the compact package 600 shown in FIGS. 6 through 8B. However, the connector 1100 can be used in the other compact packages described above or in other compact packages designed in accordance with the teachings of this disclosure.

As shown in FIG. 11, the connector 1100 includes a bolt or screw 1102, where a washer 1104 is placed around a shaft of the bolt or screw 1102 and sits near the head of the bolt or screw 1102. Note that while described as being separate components here, the bolt or screw 1102 and the washer 1104 may represent a single integral component. A spring 1106 is positioned between the washer 1104 and the enlarged portion 616 of the outer wall 604 of the compact package 600. The spring 1106 may represent a beryllium-copper spring or other spring.

Here, the connector 1100 represents a spring-loaded bolt, screw, or other spring-loaded connector that connects the enlarged portion 616 of the outer wall 604 and the transition arm 614. The spring 1106 applies a spring loading on the optical fiber 608 and can have a "soft" spring constant, such as when the spring 1106 takes a centimeter or so of displacement to compress to the desired spring force. The amount of displacement can be much greater than any anticipated variation in the thickness of the optical fiber 608 or its coating. To the extent this is achieved, this approach consistently applies a substantially constant force on the optical fiber 608 rather than a substantially constant displacement. Thus, if the polymer coating of the optical fiber 608 undergoes some slight flow over time that reduces the thickness of the coating, the force applied by the spring 1106 to the optical fiber 608 may remain essentially constant and keep the desired pressure on the interfaces with the optical fiber 608.

In these embodiments, rather than fully tightening a connector, the spring-loaded connector 1100 can be tightened partially while allowing the spring 1106 to apply the spring force. This can be repeated for each spring-loaded connector 1100 used to couple a transition arm to a base of a compact package. This may provide additional control over the squeezing force applied to the optical fiber between the enlarged portion of the outer wall and the transition arm.

Although FIG. 11 illustrates one example of a connector 1100 used with a compact package for a HARR optical fiber 100 or other optical fiber, various changes may be made to FIG. 11. For example, any other suitable connectors may be used to couple a transition arm to a base of a compact package, including non-spring-loaded connectors.

Note that for simplicity and clarity, some features and components are not explicitly shown in every figure described above, including those illustrated in connection with other figures. It will be understood that all features or any combination of features illustrated in FIGS. 1-11 may be employed in any of the embodiments described. Omission of a feature or component from a particular figure is for purposes of simplicity and clarity and is not meant to imply that the feature or component cannot be employed in the embodiments described in connection with that figure.

All of the various compact packages described above can provide a number of technical benefits or advantages depending on the implementation. For example, each compact package allows a HARR optical fiber 100 or other optical fiber to be coiled while avoiding bends of the optical fiber in undesired directions. Also, each compact package provides a planar base support for the optical fiber, and the fact that the planar base support is substantially flat greatly minimizes the possibility of the optical fiber bending in an undesired direction. Moreover, each compact package allows a HARR optical fiber 100 or other optical fiber to remain in mechanical and thermal contact with a solid mounting throughout the entire length of the optical fiber. Further, tensile forces can travel freely along an optical fiber while the optical fiber is being assembled with a compact package, and the optical fiber can be secured in place once the assembly is completed. In addition, an optical fiber can be held by each compact package without creeping, and a polymer cladding or other outer cladding of the optical fiber may be slightly compressed in some locations to help hold the optical fiber in place.

FIG. 12 illustrates an example mode stripper 310 used with a compact package for a HARR optical fiber or other optical fiber according to this disclosure. For ease of explanation, the mode stripper 310 is described as being used in the compact package 200 shown in FIGS. 2 through 5. However, the mode stripper 310 can be used in the other compact packages described above or in other compact packages designed in accordance with the teachings of this disclosure. Also, while not down shown here, at least one edge of the mode stripper 310 may be rounded as discussed above.

As shown in FIG. 12, the mode stripper 310 includes a layer 1202 of material configured to remove optical energy from an outer cladding (such as the cladding 106) of the optical fiber 306. In some embodiments, the layer 1202 includes graphite, such as an EGRAF HITHERM thermal interface material. In particular embodiments, the layer 1202 may represent a layer of graphite that is about 5 mils (about 0.127 millimeters) thick. If the layer 1202 of material is somewhat soft or pliable, the layer 1202 may be pressed onto the optical fiber 306 and mold around a portion of the optical fiber 306. The mode stripper 310 also includes a support structure 1204, which is thermally conductive and can remove thermal energy from the layer 1202. In some embodiments, the support structure 1204 represents a metal backing plate or other strong backing plate, such as an aluminum backing plate.

The mode stripper 310 may be clamped or otherwise coupled to the transition arm 308 or the base 202 in order to secure the mode stripper 310 against a portion of the optical fiber 306. Any suitable mechanism may be used to couple the mode stripper 310 to the transition arm 308 or the base 202. In some embodiments, bolts or other connectors may be used to attach the mode stripper 310 to the transition arm 308 (similar to how the outer wall 304 is attached to the transition arm 308). The layer 1202 may contact the optical fiber 306 for any suitable length of the optical fiber 306 in order to remove optical energy from the fiber's outer cladding. In some embodiments, the layer 1202 of material contacts at least about 2 inches (about 5.08 centimeters) of the optical fiber 306, although shorter or longer lengths may be used and may depend (among other things) on the amount of optical power traveling through the optical fiber 306 to be removed.

Although FIG. 12 illustrates one example of a mode stripper 310 used with a compact package for a HARR optical fiber 100 or other optical fiber, various changes may be made to FIG. 12. For example, any other suitable mechanism may be used to remove optical energy traveling within an outer cladding of an optical fiber.

FIG. 13 illustrates an example clamp 312 used with a compact package for a HARR optical fiber 100 or other optical fiber according to this disclosure. For ease of explanation, the clamp 312 is described as being used in the compact package 200 shown in FIGS. 2 through 5. However, the clamp 312 can be used in the other compact packages described above or in other compact packages designed in accordance with the teachings of this disclosure. Also, while not down shown here, at least one edge of the clamp 312 may be rounded as discussed above.

As shown in FIG. 13, the clamp 312 is formed using two parts 1302 and 1304 that can be connected together to secure the optical fiber 306 passing through the clamp 312. In this example, the part 1302 of the clamp 312 includes a projection 1306, which can fit within a groove 1308 of the other part 1304. The projection 1306 therefore has a complementary shape compared to the shape of the groove 1308. A portion of the optical fiber 306 can be placed within the groove 1308, and the optical fiber 306 can be secured within the groove 1308 by the projection 1306 when the two parts 1302 and 1304 are coupled together.

In this particular example, the projection 1306 has the shape of a flattened V, where the sides of the projection 1306 approach one another until a flat bottom is reached. The groove 1308 has a complimentary shape, which may be referred to as an inverted flattened V. However, any other suitable shapes for the projection 1306 and the groove 1308 may be used, such as when the projection 1306 is square or rectangular and the groove 1308 has a complimentary shape.

In order to couple the parts 1302 and 1304 together, the part 1302 includes a flange 1310 with an opening 1312, and the part 1304 includes a plateau 1314 with a receptacle 1316. The flange 1310 is configured to be placed on or near the plateau 1314 so that a bolt, screw, or other connector can pass through the opening 1312 and into the receptacle 1316. Tightening the connector can couple the parts 1302 and 1304 together and secure part of the optical fiber 306 within the groove 1308. Of course, any other suitable mechanism may be used to couple the parts 1302 and 1304 together.

One or more cooling channels 1318 may be used in one or more of the parts 1302 and 1304 to help remove thermal energy from the clamp 312. In this example, there are two channels 1318 shown in the part 1304, although a single channel or more than two channels may be used. Also, the part 1302 may or may not include one or more cooling channels. Fluid (such as water or other coolant) flowing through the one more cooling channels 1318 may be used to remove thermal energy from the clamp 312.

In some embodiments, the clamp 312 may secure the input or output end of the optical fiber 306 with a small amount of loading on the input or output end of the optical fiber 306. For example, the loading applied to the optical fiber 306 may be about 100 grams, although other loadings may be applied to the optical fiber 306. Also, the input or output end of the optical fiber 306 may be secured by the clamp 312 so that the input or output end of the optical fiber 306 is held in a secured position. In some embodiments, for instance, the input or output end of the optical fiber 306 may be held at about ±1 µm in the fast axis dimension and about ±10 µm in the slow axis dimension. In addition, fluid flowing through the clamp 312 may be used to remove any suitable amount of thermal energy from the clamp 312. In some embodiments, for example, the fluid may be used to remove up to about 50 watts of heat from the clamp 312.

Although FIG. 13 illustrates one example of a clamp 312 used with a compact package for a HARR optical fiber 100 or other optical fiber, various changes may be made to FIG. 13. For example, any other suitable clamps or other mechanisms may be used to secure the input and output ends of an optical fiber.

Figure 14:
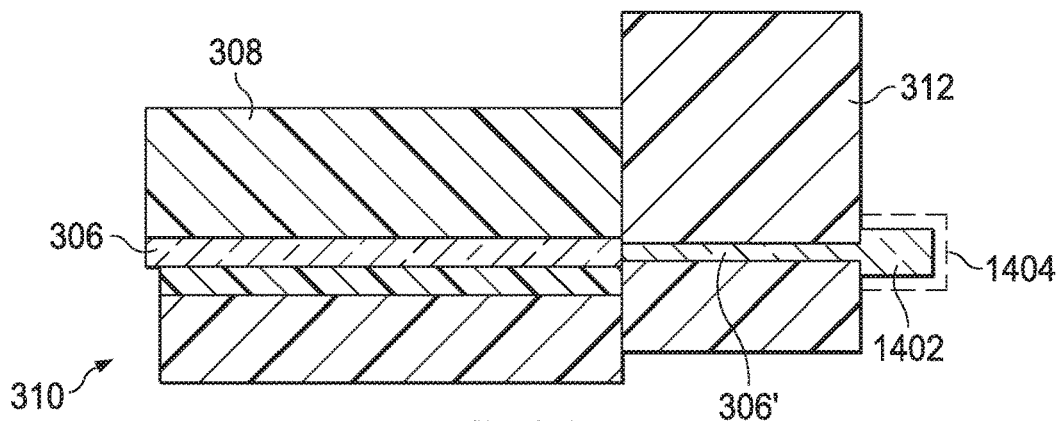
FIG. 14 illustrates an example arrangement of a mode stripper and a clamp in a compact package for a HARR optical fiber or other optical fiber according to this disclosure.

FIG. 14 illustrates an example arrangement 1400 of a mode stripper 310 and a clamp 312 in a compact package for a HARR optical fiber 100 or other optical fiber according to this disclosure. For ease of explanation, the arrangement 1400 is described as being used with the compact package 200 shown in FIGS. 2 through 5. However, the arrangement 1400 can be used with the other compact packages described above or with other compact packages designed in accordance with the teachings of this disclosure. Also, while not down shown here, at least one edge of the mode stripper 310 and/or at least one edge of the clamp 312 may be rounded as discussed above.

As shown in FIG. 14, the mode stripper 310 is pressed against the optical fiber 306 to help remove optical energy from the outer cladding of the optical fiber 306. The mode stripper 310 may be coupled to the transition arm 308 or otherwise secured so that the optical fiber 306 is clamped between the mode stripper 310 and the transition arm 308.

Unlike FIG. 3, the clamp 312 here is not coupled to the transition arm 308 (although it may be in other embodiments). Instead, the clamp 312 is attached to a portion 306' of the optical fiber 306 after the mode stripper 310. Here, the outer cladding of the optical fiber 306 has been removed, leaving a portion 306' of the optical fiber 306 that includes at least the core (such as the core 102) and the first cladding (such as the first cladding 104) of the optical fiber 306. The clamp 312 secures this portion 306' of the optical fiber 306 in place.

An endcap 1402 has been attached to the optical fiber 306 in this example. The endcap 1402 is typically spliced or otherwise connected to the tip of the optical fiber 306. For example, the endcap 1402 may be connected to the tip of the optical fiber 306 using a fusion splice. The endcap 1402 generally represents a portion of material similar to the core of the optical fiber 306, but the endcap 1402 typically lacks any doping (or at least any doping of active laser ions species). As a particular example, the endcap 1402 may be formed from silica glass. The silica glass may be undoped or doped to achieve a desired index of refraction. The endcap 1402 may have any suitable size, shape, and dimensions. As particular examples, the endcap 1402 may have the shape of a cylinder, a cube, or a rectangular prism.

In some instances, a protective ring 1404 may be placed at least partially around the endcap 1402. The protective ring 1404 may extend farther than the endcap 1402 away from the clamp 312. The protective ring 1404 thereby helps to protect the endcap 1402 from being damaged due to accidental contact with the endcap 1402. The protective ring 1404 may be formed from any suitable materials and may have any suitable size, shape, and dimensions. The protective ring 1404 may be tightly or loosely coupled to the clamp 312, to the base 202, or to any other suitable components of the compact package 300.

Although FIG. 14 illustrates one example of an arrangement 1400 of a mode stripper 310 and a clamp 312 in a compact package for a HARR optical fiber 100 or other optical fiber, various changes may be made to FIG. 14. For example, any other suitable arrangement may be used with a mode stripper 310 and a clamp 312. Also, both a mode stripper 310 and a clamp 312 may not be needed, and the endcap 1402 may or may not be used in a particular implementation.

Figure 15:
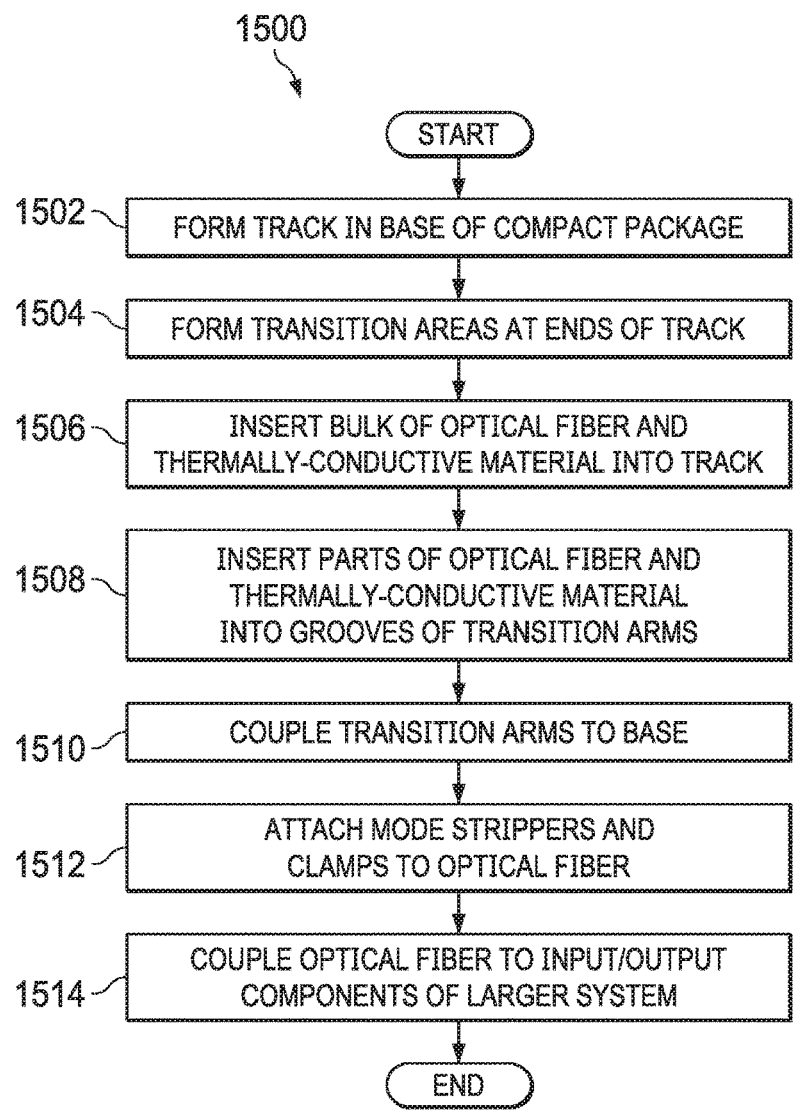
FIG. 15 illustrates an example method for forming a compact package for a HARR optical fiber or other optical fiber according to this disclosure.

FIG. 15 illustrates an example method 1500 for forming a compact package for a HARR optical fiber or other optical fiber according to this disclosure. For ease of explanation, the method 1500 shown in FIG. 15 may be described as involving the formation of the compact package 200 shown in FIGS. 2 through 5 for the HARR optical fiber 100 shown in FIG. 1. However, the method 1500 may involve the formation of any other compact package described above or other compact package designed in accordance with the teachings of this disclosure, and the compact package may be used with any other suitable optical fiber.

As shown in FIG. 15, a track is formed in a base of a compact package at step 1502, and transition areas are formed at ends of the track at step 1504. This may include, for example, processing a piece of material to form a base 202 with raised or recessed walls 304 that define a track 204. This may also include processing the material to form transition areas 210a-210b at the ends of the track 204. Space for the transition areas 210a-210b may be obtained in any suitable manner, such as by using one of the approaches described above. Note that, depending on how the base 202 is formed, steps 1502 and 1504 may occur at the same time or sequentially. For instance, the base 202 and walls 304 may be formed separately and coupled together or formed at the same time.

The bulk of an optical fiber and a thermally-conductive material are placed into the track at step 1506. This may include, for example, inserting the majority of an optical fiber 306 into the track 204 and inserting one or more spacers 402 into the track 204. The one or more spacers 402 may extend completely along the entire length of the track 204 in order to help with the thermal management of the optical fiber 306. The one or more spacers 402 may help to force the optical fiber 306 into good contact with the walls 304 of the base 202. When placing the optical fiber 306 into the track 204, the coiling direction of the optical fiber 306 can be reversed while respecting a minimum bending radius for the optical fiber 306.

Parts of the optical fiber and a thermally-conductive material are placed into grooves of two transition arms at step 1508. This may include, for example, inserting end portions of the optical fiber 306 and additional spacers into grooves of the transition arms 308. The transition arms are coupled to the base of the compact package at step 1510. This may include, for example, using bolts or other connectors to couple the transition arms 308 to enlarged portions of the outer walls 304 of the base 202. This may optionally include placing the transition arms 308 partially into recesses of the base 202. The base 202 and the transition arms 308 here help to hold the optical fiber 306 in a coiled arrangement in an at least substantially planar manner, which reduces or eliminates bending of the optical fiber 306 in an undesired direction. The transition arms 308 also help to hold the ends of the optical fiber 306 in at least substantially straight orientations, which helps to facilitate input and output to and from the optical fiber 306.

Mode strippers and clamps are attached to the optical fiber in the transition areas at step 1512. This may include, for example, coupling the mode strippers 310 to the transition arms 308 so that graphite or other material contacts the outer cladding of the optical fiber 306. This may also include stripping the outer cladding from end portions of the optical fiber 306 and clamping the end portions of the optical fiber 306 with the clamps 312.

The optical fiber is coupled to input and output components of a larger system at step 1514. This may include, for example, physically or optically coupling the optical fiber 306 (or endcaps attached to the optical fiber 306) to other optical fibers or to components that generate an input signal for the optical fiber 306 and that receive an output signal from the optical fiber 306. In general, the optical fiber 306 may be used for optical amplification, fiber lasing, or other suitable functions.

Although FIG. 15 illustrates one example of a method 1500 for forming a compact package for a HARR optical fiber 100 or other optical fiber, various changes may be made to FIG. 15. For example, while shown as a series of steps, various steps in FIG. 15 may overlap, occur in parallel, occur in a different order, or occur any number of times.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, it is important to recognize that alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a base comprising walls that define a track, the track having an input end and an output end, the track defining a coiled path that spirals inward from the input end of the track, reaches an inflection point where a direction of curvature is reversed, and spirals outward in a reverse direction to the output end of the track, the track configured to receive a majority of an optical fiber and to maintain the majority of the optical fiber in an at least substantially planar coiled arrangement; and
   a first transition arm positioned at the input end of the track and a second transition arm positioned at the output end of the track, each transition arm configured to be mechanically coupled to the base, each transition arm comprising a groove configured to receive a portion of the optical fiber and to maintain the portion of the optical fiber in an at least substantially straight orientation;
   wherein the walls and the transition arms are configured to maintain thermal contact with the optical fiber along an entire length of the optical fiber.

2. The apparatus of claim 1, further comprising:
   one or more thermally-conductive spacers positioned within the track, the one or more thermally-conductive spacers configured to push the optical fiber into the walls of the base and to transfer thermal energy from the optical fiber to the walls of the base.

3. The apparatus of claim 1, further comprising:
   a first mode stripper configured to contact the portion of the optical fiber in the first transition arm; and
   a second mode stripper configured to contact the portion of the optical fiber in the second transition arm;
   wherein each mode stripper is configured to remove optical energy propagating through an outer cladding of the optical fiber.

4. The apparatus of claim 1, further comprising:
   a first clamp configured to receive and hold an input end of the optical fiber; and
   a second clamp configured to receive and hold an output end of the optical fiber.

5. The apparatus of claim 1, further comprising:
   one or more thermally-conductive spacers positioned within the groove of each transition arm and configured to push the optical fiber into at least one of a mode stripper and a clamp.

6. The apparatus of claim 1, wherein each transition arm is partially recessed within the base so that the portions of the optical fiber in the transition arms are at least substantially planar with the majority of the optical fiber in the track.

7. The apparatus of claim 1, wherein each transition arm is mechanically coupled to an enlarged portion of one of the walls using spring-loaded connectors, the enlarged portion of the wall having slots that are elongated in a direction parallel to a length of the transition arm in order to allow translation of the transition arm along part of the enlarged portion of the wall.

8. The apparatus of claim 1, wherein the walls of the base comprise second grooves configured to receive the optical fiber.

9. A system comprising:
an optical fiber; and
a package configured to receive the optical fiber, the package comprising:
  a base comprising walls that define a track, the track having an input end and an output end, the track defining a coiled path that spirals inward from the input end of the track, reaches an inflection point where a direction of curvature is reversed, and spirals outward in a reverse direction to the output end of the track, the track configured to receive a majority of the optical fiber and to maintain the majority of the optical fiber in an at least substantially planar coiled arrangement; and
  a first transition arm positioned at the input end of the track and a second transition arm positioned at the output end of the track, each transition arm configured to be mechanically coupled to the base, each transition arm comprising a groove configured to receive a portion of the optical fiber and to maintain the portion of the optical fiber in an at least substantially straight orientation;
wherein the walls and the transition arms are configured to maintain thermal contact with the optical fiber along an entire length of the optical fiber.

10. The system of claim 9, wherein:
the package further comprises one or more thermally-conductive spacers positioned within the track; and
the one or more thermally-conductive spacers are configured to push the optical fiber into the walls of the base and to transfer thermal energy from the optical fiber to the walls of the base.

11. The system of claim 9, wherein the package further comprises:
a first mode stripper configured to contact the portion of the optical fiber in the first transition arm; and
a second mode stripper configured to contact the portion of the optical fiber in the second transition arm; and
wherein each mode stripper is configured to remove optical energy propagating through an outer cladding of the optical fiber.

12. The system of claim 9, wherein the package further comprises:
a first clamp configured to receive and hold an input end of the optical fiber; and
a second clamp configured to receive and hold an output end of the optical fiber.

13. The system of claim 12, wherein:
the optical fiber comprises an outer cladding;
the input end of the optical fiber held by the first clamp lacks the outer cladding and is attached to a first endcap; and
the output end of the optical fiber held by the second clamp lacks the outer cladding and is attached to a second endcap.

14. The system of claim 9, wherein the package further comprises one or more thermally-conductive spacers positioned within the groove of each transition arm and configured to push the optical fiber into at least one of a mode stripper and a clamp.

15. The system of claim 9, wherein each transition arm is partially recessed within the base so that the portions of the optical fiber in the transition arms are at least substantially planar with the majority of the optical fiber in the track.

16. The system of claim 9, wherein each transition arm is mechanically coupled to an enlarged portion of one of the walls using spring-loaded connectors, the enlarged portion of the wall having slots that are elongated in a direction parallel to a length of the transition arm in order to allow translation of the transition arm along part of the enlarged portion of the wall.

17. The system of claim 9, wherein the walls of the base comprise second grooves configured to receive the optical fiber.

18. The system of claim 9, wherein:
the optical fiber comprises a core having a larger dimension and a smaller dimension;
the optical fiber is bent about an axis parallel to its larger dimension to coil the optical fiber in the package; and
the package is configured to minimize bending of the optical fiber about an axis parallel to its smaller dimension.

19. A method comprising:
obtaining a base comprising walls that define a track, the track having an input end and an output end, the track defining a coiled path that spirals inward from the input end of the track, reaches an inflection point where a direction of curvature is reversed, and spirals outward in a reverse direction to the output end of the track;
positioning a first transition arm at the input end of the track and a second transition arm at the output end of the track, each transition arm mechanically coupled to the base;
inserting a majority of an optical fiber into the track, the track maintaining the majority of the optical fiber in an at least substantially planar coiled arrangement; and
inserting portions of the optical fiber into grooves of the transition arms, the transition arms maintaining the portions of the optical fiber in an at least substantially straight orientation;
wherein the walls and the transition arms are configured to maintain thermal contact with the optical fiber along an entire length of the optical fiber.

20. The method of claim 19, further comprising:
inserting one or more thermally-conductive spacers within the track, the one or more thermally-conductive spacers configured to push the optical fiber into the walls of the base and to transfer thermal energy from the optical fiber to the walls of the base.

21. The method of claim 19, further comprising:
contacting the portion of the optical fiber in the first transition arm with a first mode stripper;
clamping an input end of the optical fiber using a first clamp;
contacting the portion of the optical fiber in the second transition arm with a second mode stripper; and
clamping an output end of the optical fiber using a second clamp;
wherein each mode stripper is configured to remove optical energy propagating through an outer cladding of the optical fiber.

22. The method of claim 19, further comprising:
recessing each transition arm partially within the base so that the portions of the optical fiber in the transition arms are at least substantially planar with the majority of the optical fiber in the track.

23. The apparatus of claim 1, wherein inward spirals of the coiled path are interleaved with outward spirals of the coiled path.

* * * * *